US008889075B2

(12) United States Patent
Tanaka et al.

(10) Patent No.: US 8,889,075 B2
(45) Date of Patent: Nov. 18, 2014

(54) APPARATUS FOR PRODUCING WATER HAVING REDOX ACTIVITY

(75) Inventors: Kenichiro Tanaka, Kitakyushu (JP); Licca Tanaka, Kitakyushu (JP); Tomonori Kawano, Kitakyushu (JP)

(73) Assignee: Kitakyushu Foundation for the Advancement of Industry, Science and Technology, Fukuoka (JP)

( * ) Notice: Subject to any disclaimer, the term of this patent is extended or adjusted under 35 U.S.C. 154(b) by 1007 days.

(21) Appl. No.: 12/733,934

(22) PCT Filed: Sep. 26, 2008

(86) PCT No.: PCT/JP2008/067570
§ 371 (c)(1),
(2), (4) Date: Apr. 27, 2010

(87) PCT Pub. No.: WO2009/041670
PCT Pub. Date: Apr. 2, 2009

(65) Prior Publication Data
US 2010/0247390 A1  Sep. 30, 2010

(30) Foreign Application Priority Data
Sep. 26, 2007 (JP) ................................. 2007-250284

(51) Int. Cl.
*B01J 19/10* (2006.01)
(52) U.S. Cl.
USPC ...................................... 422/128; 250/432 R
(58) Field of Classification Search
USPC .................. 422/21, 24, 128; 250/428, 432 R
See application file for complete search history.

(56) References Cited

U.S. PATENT DOCUMENTS

| 2004/0170538 A1 | 9/2004 | Kawakami et al. |
| 2007/0034574 A1 | 2/2007 | Hu et al. |

FOREIGN PATENT DOCUMENTS

| EP | 1 375 432 | | 1/2004 |
| JP | 5-309267 | | 11/1993 |
| JP | 11-319857 | | 11/1999 |
| JP | 2000-157166 | | 6/2000 |
| JP | 2002-263176 A | * | 9/2002 |
| JP | 2002-355551 | | 12/2002 |
| JP | 2003-026406 | | 1/2003 |
| JP | 2003-112053 | | 4/2003 |
| JP | 2004-130196 | | 4/2004 |
| JP | 2004-154742 A | * | 6/2004 |
| JP | 2005-21794 | | 1/2005 |
| JP | 2005-246294 | | 9/2005 |
| JP | 2007/004592 | | 1/2007 |
| JP | 2007-116267 | | 4/2007 |
| WO | WO-02/079096 | | 10/2002 |

OTHER PUBLICATIONS

English machine translation of JP2004-154742A; published Jun. 2004; inventor:Tsuchiya, Masao.*

(Continued)

*Primary Examiner* — Sean E Conley
(74) *Attorney, Agent, or Firm* — Jordan and Hamburg LLP

(57) ABSTRACT

The present invention provides an apparatus for producing water having redox activity. In the apparatus, at least one of oxygen, ozone, chlorine, nitrogen monoxide, and ammonia as a reaction precursor is previously mixed into water or running water while regulating the concentration of the dissolved substance followed by the application of ultrasonic vibrations, whereby active oxygen species are generated in water. In another embodiment, water or running water is brought into contact with a catalyst to which ultrasonic vibrations or electromagnetic waves have been applied, whereby active oxygen species are generated in water.

6 Claims, 16 Drawing Sheets

(56) References Cited

OTHER PUBLICATIONS

English machine translation of JP2002-263176A; published Sep. 2002; inventor: Suzuki, Shinichi et al.*

English machine translation of JP2003-026406A; published Jan. 2003; inventor: Kitano et al.*

"Air pollution and its relations to climate change and sustainable development, 2. Climate change and air pollution, Mar. 12-14, 2007, Gothenburg, Sweden." Akimoto, Hajime and Kengo Sudo, <http://asta.ivl.se/Workshops/>.

Aug. 16, 2007 "Indirect radiative forcing of climate change through ozone effects on the land-carbon sink." S. Sitch et al. Nature. vol. 448, No. 7155. pp. 791-794.

* cited by examiner

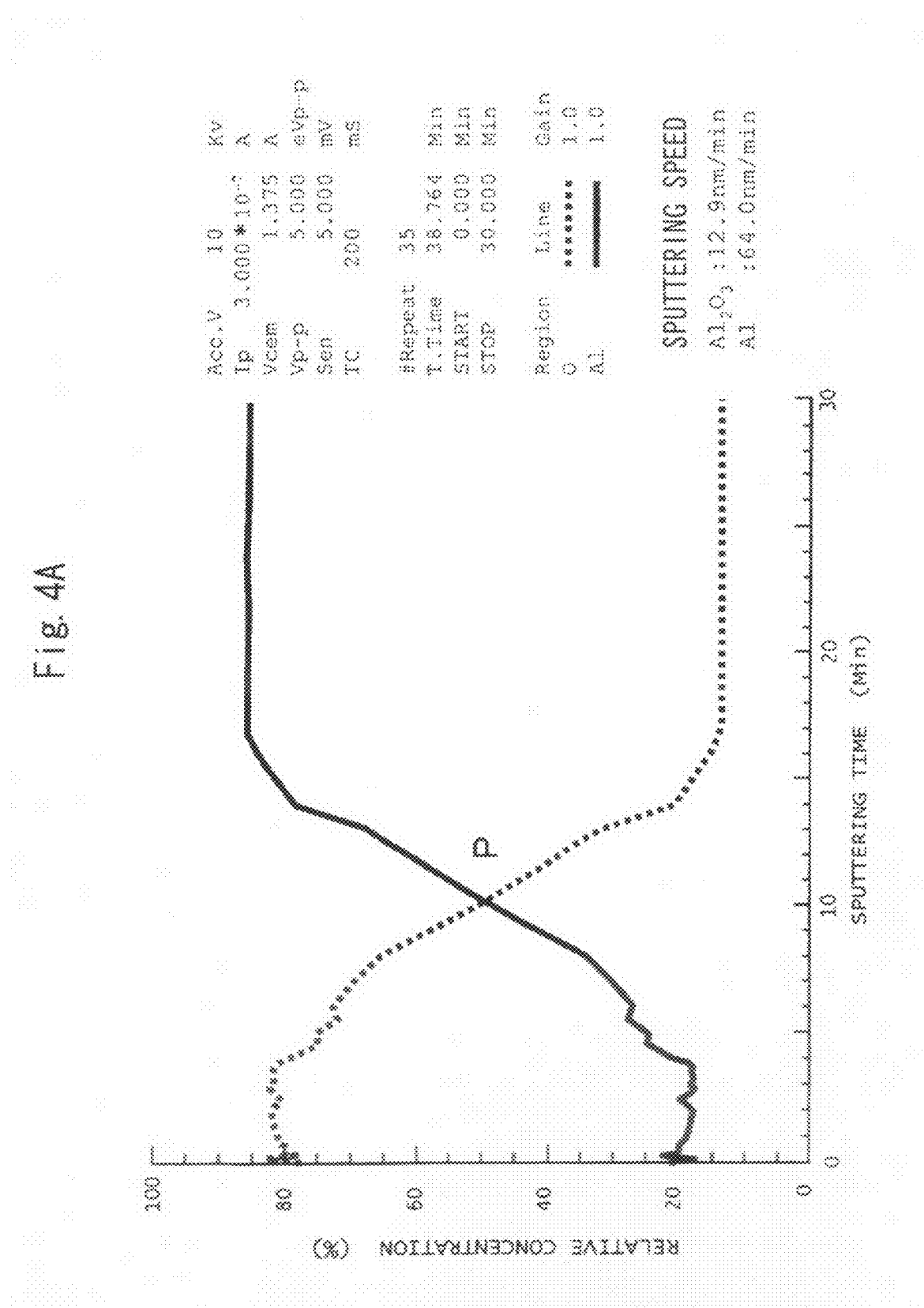

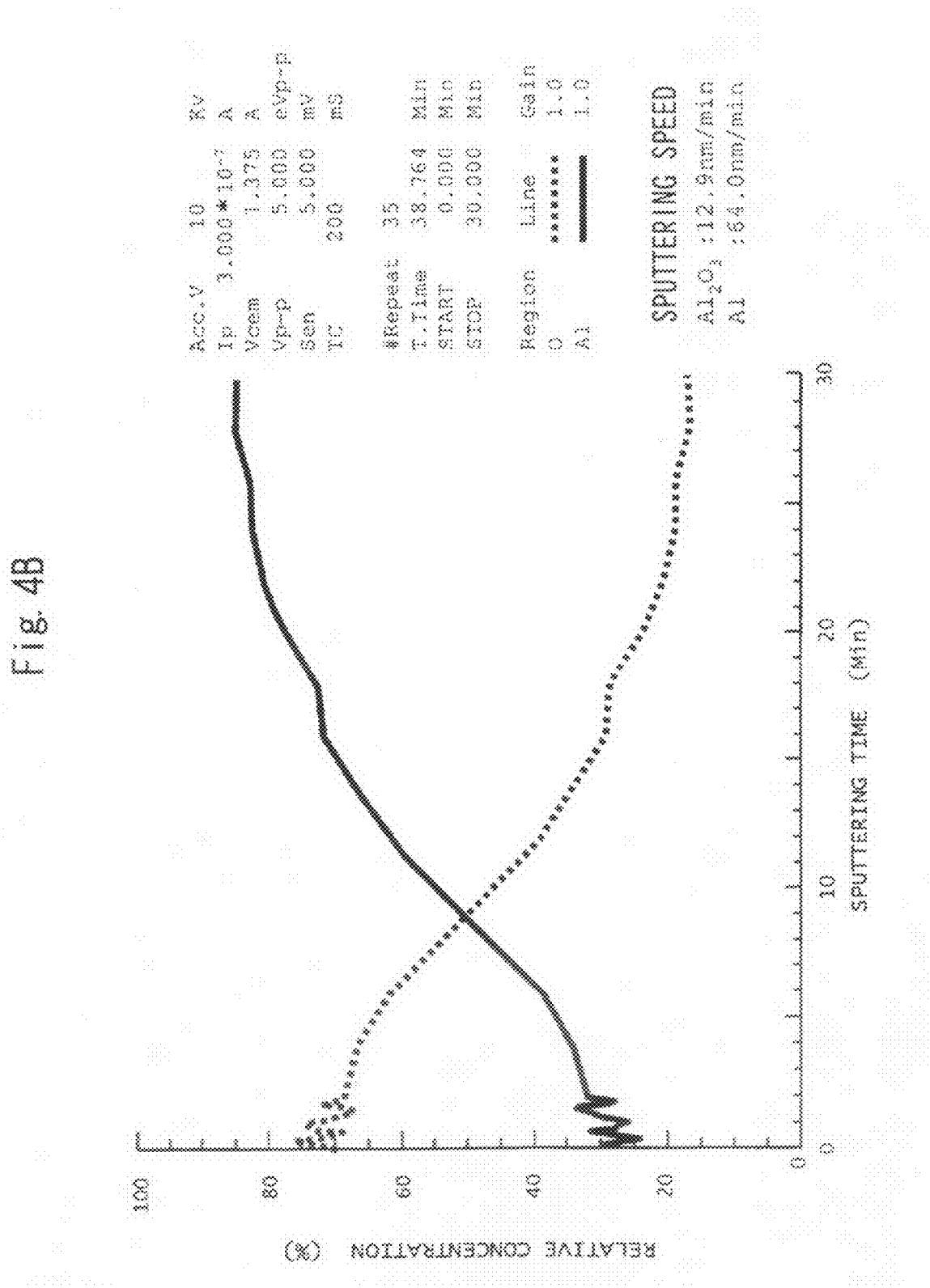

APPARATUS FOR PRODUCING WATER HAVING REDOX ACTIVITY

BACKGROUND OF THE INVENTION

The present invention relates to an apparatus for producing water having redox activity which can generate an in-vivo redox reaction and an apparatus for producing water having redox activity.

Amidst a world-wide demand for the advent of novel technology on the reduction of emission of $CO_2$ which will be effective in coping with global warming, with respect to water treatment technology, the sterilization of bacteria, the elimination of microorganisms and the decomposition of organic substances in water are mainly carried out by the decomposition using chemicals, a filtering method using a film, sterilization using ultraviolet rays and an oxygen reduction reaction using ozone.

Among these methods, with respect to the ozone method, the use of an ultra-high-concentration ozone method in which ozone concentration is high exceeding 200 ppm has been studied and developed. It is thought that no burden is imposed on the environment due to residual ozone because of instable property of ozone per se. However, due to strong oxidation power of ozone, a cost for applying anti-corrosion countermeasure to piping and processing facilities increases, and anti-corrosion countermeasure such as Teflon coating becomes inevitable in all circuits.

In reality, the residual ozone is present in a stable state in water for several hours, and vaporized ozone continuously affects the environment even after being discharged into the atmosphere. Even ozone of low concentration also directly affects a human body through a respiratory organ trouble or the like. Although the drawback caused by ozone is confused with the acceleration of global warming caused by the destruction of the ozone layer in the stratosphere, ozone is heavier than carbon dioxide and ozone generated on the ground does not reach the stratosphere and remains in the troposphere thus accelerating the global warming.

There has also been a report that the troposphere ozone per se is a gas with a strong greenhouse effect and hence, 20 to 30% of the global warming brought about by the whole greenhouse gas effect is derived from a forced radiation of the troposphere ozone (see non-patent document 1, for example).

Further, according to a recent report, there has been reported a simulation result that when the secondary influence exerted on the vegetation which is expected to absorb carbon dioxide is taken into consideration in addition to the direct greenhouse effect due to ozone, the greenhouse effect derived from the troposphere ozone becomes twice as large as the conventionally expected greenhouse effect (see non-patent document 2, for example).

It has been thought that most of the troposphere ozone is a photochemical oxidant which is generated due to a photochemical reaction between ultraviolet rays in solar beams and nitrogen oxide, carbon hydride or the like discharged from factories or internal combustion engines of automobiles and the like. However, along with the utilization of ozone water in a wide range covering the sterilization in kitchens or the like or the use of ozone water in fish farms and ordinary households, residual ozone discharged and diffused from ozone water is added to the troposphere ozone. This addition of the residual ozone is considered one reason that photochemical smog alarm (the alarm being given when a state where the atmospheric ozone concentration exceeds 0.12 ppm continues for 1 hour) is generated not only in industrial cities and large urban cities but also in local cities and rural areas.

Accordingly, there has been a demand for the development of novel technology which can readily dissipate the residual ozone generated by ozone treatment thus reducing a total ozone discharge quantity.

On the other hand, it has been known that active oxygen species which exist in a wide range constantly in nature and in living organisms cause a cell membrane disorder due to their strong oxidation power and have sterilization and antiparasitic ability. The utilization of active oxygen species in an air cleaner or the like has been attracting attentions.

Further, the presence of active oxygen species as a causal substance for cytotoxicity which generates carcinogenic activity or angiogenic activity has been confirmed and has also been treated as an in-vivo disorder transmission substance. The characteristic of the active oxygen species is clarified in the course of investigating the cause of the in-vivo disorder. It is found that superoxide dismutase (SOD) and NO. are in charge of the elimination of $O_2^-$ in the living organism thus maintaining the homeostasis.

Originally, the active oxygen species indicate, in general, oxygen species such as superoxide anion radicals $O_2^-$), hydrogen peroxide water ($H_2O_2$), hydroxy radicals (.OH), singlet oxygen ($^1O_2$), while the active oxygen species indicate, in a broader meaning, lipid peroxide (LOOH, LOO.), halogenation oxygen ($ClO^-$) and, further, nitrogen monoxide radicals (NO.) or organic radical species containing oxygen which is identified as a relaxation factor derived from in-vivo vascular endothelial.

In the broader meaning, although hydrogen peroxide belongs to a category of active oxygen species, hydrogen peroxide clearly differs from other active oxygen species with respect to the points that hydrogen peroxide is an extremely stable compound, can be preserved for a long period at a room temperature, and can be generated at high concentration and the like. However, due to their characteristics of hydrogen peroxide where the concentration of hydrogen peroxide can be easily measured even with a ultra minute quantity in a luminol reaction or the like, for elucidating an oxygen reduction reaction, that is, a redox reaction in an ecological system and a living organism, hydrogen peroxide is incorporated and is used as a stimulus transmission substance for general purpose.

Accordingly, the active oxygen species according to the present invention include singlet oxygen ($^1O_2$) and cyclic peroxide and hydroperoxide generated from singlet oxygen in addition to so-called free radicals such as superoxide anion radicals ($O_2^-$), hydroxy radicals (.OH), lipid peroxide (LOOH, LOO.), halogenation oxygen ($ClO^-$), nitrogen monoxide radicals (NO.), organic radical species containing oxygen (phenoxy radicals, for example), and do not include hydrogen peroxide.

Further, recently, an in-vitro measurement method and an in-vitro determination technique have been developed, and it has been found that the lifetime of the active oxygen species can be held or operated only for an extremely short time of several milliseconds or less, and it is considered that the constant quantitative generation of the active oxygen species except for hydrogen peroxide is impossible.

It has been clarified that the redox reaction which is an oxygen reduction reaction attributed to these active oxygen species brings about the protein synthesis or synthesis of signal transmission substances through various paths in cells. However, the role of the redox reaction attributed to active oxygen species in nature has not yet been completely clarified.

Activities which develop the redox activity which is an oxygen reduction reaction generated in living organism cells in vitro are collectively referred to as the redox activity of the present invention. Here, as a result of the generation of intracellular redox reaction attributed to the extracellular administration of active oxygen species, the presence or the non-presence of activities is evaluated by confirming the apparent cell death (individual death in case of protozoan) attributed to cell degeneration or an apparent switching signal of a calcium channel existing on a biological membrane.

Further, although it is thought that active oxygen species are contained as part of minus ions, minus ions are substances which are charged with negative electricity among substances charged with slight electricity contained in air. These minus ions also exist in nature and are considered to contribute to equilibrium of an environment. However, there exists an opinion which doubts the identification and quantitative property of these substances which are considered effective at a low level of a femtomolar/L which is $\frac{1}{1000}$ of nanomolar/L, and the activity of minus ions on living organisms and the generation and disappearance process of minus ions has not yet been clarified.

On the other hand, free electrons and holes which are generated due to the excitation of a photocatalytic reaction caused by the radiation of light to a photocatalytic body react with water and oxygen so as to generate active oxygen species. However, with respect to a device which verifies and identifies active oxygen species such as super-oxide anion radicals and hydroxy radicals other than an ultra minute quantity of hydrogen peroxide, there is no device other than an active oxygen water producing apparatus at this point of time (see patent document 3, for example). Further, patent document 3 also discloses that super-oxide anion radicals generated by the device appear for a long period of time and the device can produce such water as the water containing active oxygen species and maintains the activity thereof for a long period of time.

Further, a photocatalytic reaction excites a photocatalytic body by radiating ultraviolet rays so that free electrons and holes are generated on a surface of the photocatalytic body, and the photocatalytic body is made of titania. Heretofore, there has been a report where titania powder brings about the decomposition of organic substance by free electrons and holes due to the low-frequency ultrasonic vibrations, and a photocatalytic reaction is generated by sources other than the radiation of ultraviolet rays. Further, it has been reported that the appearance of the hydroxy radicals due to free electrons and holes generated by the radiation of the ultraviolet rays using aluminum oxide powder is confirmed (see patent document 4), for example.

Further, as a water treatment technique which possesses an oxidization force in water and can maintain the activity for a long period of time, there have been known nano-bubbles proposed by National Institute of Advanced Industrial & Technology (see patent document 5, for example). In this technique, by applying physical stimulus to minute bubbles containing oxygen which are contained in an aqueous solution, the bubble diameter of the minute bubbles is sharply shrunken thus manufacturing oxygen nano-bubbles. As a device which can perform the water treatment technique, in a process of sharply shrinking the minute bubbles, by applying strong cavitation energy to bubbles using the ionization decomposition and low-frequency ultrasonic vibrations of 26 kHz, a phisico-chemical change is applied to the minute bubbles.

Further, as a method which enables long-period preservation of fruits and vegetables using atomized water vapor as water containing active oxygen, there has been known a method for long-period preservation of fruits and vegetables proposed by NISSHOKU Corporation (see patent document 6, for example). Here, water containing active oxygen of extremely high concentration of 1 to 10 ppm is atomized as vapor in the atmosphere by a photocatalytic reaction and the electro-chemical reduction of polyaniline which is an electron-donating polymer and hence, the bacteria which adhere to surfaces of fruits and vegetables and stored in a humid refrigerator can be sterilized. However, there is no commercially available device which can carry out this method.

[Non-patent document 1] H. Akimoto and K. Sudo. Climate Sensitivity of Ozone. In: Air pollution and its relations to climate change and sustainable development, 2. Climate change and air pollution. 12-14 Mar., 2007, Gothenburg, Sweden; http://asta.ivl.se/Workshops/
[Non-patent document 2] Nature. 2007; Vol. 448, No. 7155: pp. 791-794
[Patent document 3] JP-A-2007-116267
[Patent document 4] JP-A-2003-112053
[Patent document 5] JP-A-2005-246294
[Patent document 6] JP-A-2000-157166

SUMMARY OF THE INVENTION

However, in the above-mentioned conventional method where water which is in contact with the photocatalytic body contains active oxygen species in a state where ultraviolet rays are radiated to the photocatalytic body, when permeability of the ultraviolet rays is lowered due to water quality, it is difficult for the water to contain sufficient quantity of active oxygen species.

That is, when water is cloudy or turbid, ultraviolet rays radiated from a light source scatter in water, and are attenuated before reaching the photocatalytic body and hence, it is difficult to sufficiently excite the photocatalytic body.

Accordingly, there has been a demand for a technique which allows water to contain a sufficient quantity of active oxygen species, and can simply and stably supply water with the least influence of turbidity of water.

The present invention has been made under such circumstances, and it is an object of the present invention to provide an apparatus for producing water having redox activity which allows water to contain a sufficient quantity of active oxygen species in a state where activity of the active oxygen species can be held and work for a long period of time and can generate a redox reaction in a living organism irrespective of the clarity (ultraviolet rays permeability) of water, and can generate a redox reaction in a living organism.

To overcome the above-mentioned conventional drawbacks, according to a first aspect of the invention, in an apparatus for producing water having redox activity an electromagnetic wave source and a fibrous catalytic body are arranged with a fixed gap defined therebetween thus allowing a water flow to flow into or flow out from tissues of the fibrous catalytic body.

In a further aspect of the invention, the apparatus for producing water having redox activity is configured to bring water or running water into contact with the fibrous catalytic body while radiating electromagnetic waves to the fibrous catalytic body and/or applying ultrasonic vibrations to the fibrous catalytic body thus allowing water to contain active oxygen species, and the apparatus includes a closed vessel having an independent water inlet part and an independent water outlet part for water or running water as a reaction generation vessel for producing water having redox activity, a light source of ultraviolet rays which is a kind of microwaves or a microwave vibrator is arranged in water in the closed vessel, and the fibrous catalytic body surrounds the periphery of the electromagnetic wave source with a fixed gap therebetween, whereby a water flow is formed of a first water flow which ascends or descends by passing through the gap defined between the microwave source and the fibrous catalytic body, a second water flow which ascends or descends by spirally passing over the outer periphery of the fibrous catalytic body, and a third water flow which flows into or flows out from the tissues of the fibrous catalytic body.

In another aspect of the invention, in the apparatus for producing water having redox activity the fibrous catalytic body is configured so that a surface of each of the fibers is covered with a catalytic film having a catalytic function.

In yet another aspect of the invention, in the apparatus for producing water having redox activity the fibers are made of at least any one of metal selected from a group consisting of metal such as aluminum or stainless steel, carbon fibers, glass, ceramics and a non-woven fabric.

In another aspect of the invention, in the apparatus for producing water having redox activity the catalytic film is mainly made of one kind or a composite of plural kinds of catalytic active substances selected from a group consisting of alumina, titania, zinc oxide, magnesium oxide, magnesium hydroxide, aluminum hydroxide, tungsten oxide, barium titanate, strontium titanate, sodium titanate, zirconium dioxide, molybdenum oxide, hydroxide molybdenum compound, tungsten oxide, hydroxide tungsten compound, $\alpha\text{-Fe}_2O_3$, cadmium sulfide, zinc sulfide, platinum, copper, silver, palladium and the like.

In yet another aspect of the invention, in the apparatus for producing water having redox activity the catalytic film contains the catalytic active substance in a form of a crystalline body and/or a sintered body, and has a thickness of 30 nm or more.

In another aspect of the invention, in the apparatus for producing water having redox activity the electromagnetic waves are at least one kind of short-wavelength electromagnetic waves selected from a group consisting of ultraviolet rays, visible beams and microwaves.

In yet another aspect of the invention, in the apparatus for producing water having redox activity the ultrasonic waves are ultrasonic waves of 101 kHz or more and less than 500 kHz generated by an ultrasonic vibrator.

In yet another aspect of the invention, in the apparatus for producing water having redox activity the ultrasonic waves are ultrasonic waves of 500 kHz or more generated by an ultrasonic vibrator.

In yet another aspect of the invention, in the apparatus for producing water having redox activity, into water or running water which is brought into contact with the catalytic body, at least one kind selected from a group consisting of oxygen, ozone, chlorine, nitrogen monoxide and ammonia is preliminarily mixed while adjusting the dissolved concentration.

In another aspect of the invention, the apparatus for producing water having redox activity, is configured to vibrate free ends of the fibrous catalytic body by imparting ultrasonic vibrations to the fibrous catalytic body in radiating the electromagnetic waves from the electromagnetic wave source to the fibrous catalytic body thus increasing a flow speed of water which flows while being in contact with a surface of the fibrous catalytic body, whereby the active oxygen species generated by the radiation of the electromagnetic waves to the fibrous catalytic body is diffused in the water which flows on the surface of the fibrous catalytic body thus imparting a function of the active oxygen species to the water, and the water is discharged and taken out from the reaction generation vessel for producing water having redox activity.

In yet another aspect of the invention, in the apparatus for producing water having redox activity an electromagnetic wave source and a fibrous catalytic body are arranged with a fixed gap defined therebetween thus allowing a water flow to flow into or flow out from tissues of the fibrous catalytic body. Accordingly, it is possible to produce water having redox activity which allow water to contain a sufficient quantity of active oxygen species in a state where activity of the active oxygen species can be held and work for a long period of time and can generate a redox reaction in a living organism irrespective of the clarity (ultraviolet rays permeability) of water, and can generate a redox reaction in a living organism. Further, by efficiently making the free electrons and holes generated by catalytic body to which the electromagnetic waves are radiated and water or running water react with each other, a large quantity of active oxygen species can be produced. Further, due to a reaction between the active oxygen species with the dissolved substance in an aqueous solution, water containing active oxygen species is produced. By taking out water containing active oxygen species to the outside of an apparatus for producing water having redox activity and by applying water containing active oxygen species to a living mechanism in vitro at a different location while allowing the water to maintain a high oxidization force, an in-vivo redox reaction is generated. As a result, it is possible to cause intracellular degeneration and individual death so that it is possible to produce water having not only an excellent sterilizing function and a function of eliminating protozoa but also a function of maintaining an organic substance decomposition function for a long period of time.

Accordingly, it is possible to realize the sterilization of microorganisms, the elimination of protozoa, and the decomposition of organic substances. Further, due to the realization of the elimination of protozoa, it is also possible to perform the sterilization of *Legionella* proliferated in the body of protozoa such as ameba. Particularly, when running water is brought into contact with the catalytic body to which electromagnetic waves are radiated, running water downstream of the catalytic body becomes water containing a large quantity of active oxygen species.

In yet another aspect of the invention, the apparatus for producing water having redox activity is configured to bring water or running water into contact with the fibrous catalytic body while radiating electromagnetic waves to the fibrous catalytic body and/or applying ultrasonic vibrations to the fibrous catalytic body thus allowing water to contain active oxygen species, and the apparatus includes a closed vessel having an independent water inlet part and an independent water outlet part for water or running water as a reaction generation vessel for producing water having redox activity, a light source of ultraviolet rays which is a kind of microwaves or a microwave vibrator is arranged in water in the closed vessel, and the fibrous catalytic body surrounds the periphery of the electromagnetic wave source with a fixed gap therebetween, whereby a water flow is formed of a first water flow which ascends or descends by passing through the gap defined between the microwave source and the fibrous catalytic body, a second water flow which ascends or descends by spirally passing over the outer periphery of the fibrous catalytic body, and a third water flow which flows into or flows out from the tissues of the fibrous catalytic body. Accordingly, it is possible to directly apply strong cavitation energy to oxygen atoms contained in water and hence, a physicochemical change is applied to oxygen atoms thus generating active oxygen species. Further, it is possible to produce water containing active oxygen species by making free electrons and holes efficiently generated on a surface of the catalytic body react with water, a gas dissolved in water or ions dissolved in water. Further, the free electrons and the holes which are generated on the catalytic body to which the ultrasonic vibrations are applied in addition to the electromagnetic waves increase an interface boundary flow speed on a surface of the catalytic body due to the movement of the catalytic body caused by the ultrasonic vibrations. Accordingly, it is possible to readily separate free electrons and holes from the catalytic body so that it is possible to react the active oxygen species with water or running water whereby it is possible to generate a larger quantity of active oxygen species. Further, due to a reaction between the active oxygen species with the dissolved substances in an aqueous solution, water containing active oxygen species is produced. By taking out water containing active oxygen species to the outside of an apparatus for producing water having redox activity and by applying water containing active oxygen species to a living mechanism in vitro while allowing the water to maintain a high oxidization force, an in-vivo redox reaction is generated. As a result, it is possible to cause the cell death attributed to the intracellular degeneration and individual death so that it is possible to produce water having not only an excellent sterilizing function and a function of eliminating of protozoa but also a function of maintaining an organic substance decomposition function for a long period of time. Further, the free electrons and the holes which are generated on the catalytic body to which the ultrasonic vibrations are applied in addition to the electromagnetic waves increase an interface boundary flow speed on a surface of the catalytic body due to the movement of the catalytic body caused by the ultrasonic vibrations. Accordingly, it is possible to readily separate free electrons and holes from the catalytic body so that it is possible to react the active oxygen species with water or running water whereby it is possible to generate a larger quantity of active oxygen species. Further, due to a reaction between the active oxygen species with the dissolved substances in an aqueous solution, water containing active oxygen species is produced. By taking out water containing active oxygen species to the outside of an apparatus for producing water having redox activity and by applying water containing active oxygen species to a living mechanism in vitro while allowing the water to maintain a high oxidization force, an in-vivo redox reaction is generated. As a result, it is possible to cause the cell death attributed to the intracellular degeneration and individual death so that it is possible to produce water having not only an excellent sterilizing function and a function of eliminating of protozoa but also a function of maintaining an organic substance decomposition function for a long period of time.

Further, due to the realization of the elimination of protozoa, it is also possible to perform the sterilization of *Legionella* proliferated in the body of protozoa such as ameba. Particularly, when running water is brought into contact with the catalytic body to which ultrasonic waves are applied in addition to the radiation of electromagnetic waves, running water downstream of the catalytic body becomes water containing a large quantity of active oxygen species and hence, it is possible to produce water which has the stronger redox activity.

Further, due to the realization of the elimination of protozoa, it is also possible to perform the sterilization of *Legionella* proliferated in the body of protozoa such as ameba. When the running water is brought into contact with the catalytic body to which ultrasonic waves are applied, since free electrons and holes are generated on a surface of the catalytic body to which ultrasonic waves are applied irrespective of transparence, running water downstream of the catalytic body becomes water containing a larger quantity of active oxygen species thus enabling the production of water having stronger redox activity.

Further, in another aspect of the invention, in the apparatus for producing water having redox activity, the ultrasonic waves are ultrasonic waves of 101 kHz or more and less than 500 kHz generated by an ultrasonic vibrator. In using the middle-frequency ultrasonic waves of 101 kHz or more and less than 500 kHz generated by a middle-frequency ultrasonic vibrator, when the ultrasonic waves impinge on the photocatalytic body, the diffraction property of sound waves is increased so that the agitation of water in a closed vessel is further enhanced whereby free electrons and holes are generated and efficiently separated from the photocatalytic body. Further, an action of the middle-frequency ultrasonic waves brings about a cleaning effect with respect to substances having relatively large molecular weights such as contamination components adhered to the photocatalytic body.

Further, in yet another aspect os the invention in the apparatus for producing water having redox activity, the ultrasonic waves are ultrasonic waves of 500 kHz or more generated by an ultrasonic vibrator. Ultrasonic vibrations of 500 kHz or more generated by a high-frequency ultrasonic vibrator are, usually, used for generating fog by vibrating a gas/liquid interface and hence, a fiber cleaning ability of the ultrasonic vibrations is low. However, the strong cavitation energy of the ultrasonic vibrations directly acts on oxygen atoms dissolved in water and hence, ultrasonic vibrations have enough power of a level which allows not only the generation of the active oxygen species but also the generation of a catalytic reaction on a catalyst film, and scatters the electrons, active oxygen species and the like generated due to the catalytic reaction into water. Accordingly, it is possible to prevent damages on the catalytic body and the deterioration of the catalytic body, and the active oxygen species can be generated with low power and high efficiency.

In another aspect of the invention, in the apparatus for producing water having redox activity, into water or running water which is brought into contact with the catalytic body, at least one kind of oxygen, ozone, chlorine, nitrogen monoxide, ammonia and hydrogen peroxide water is preliminarily mixed while adjusting the dissolved concentration. Accordingly, the efficiency in generating the active oxygen species can be further enhanced. Further, the following characteristic reactions take place. That is, when a quantity of dissolved oxygen is increased, the concentration of superoxide anion radicals is increased. When the concentration of ozone is increased, the concentration of singlet oxygen is increased. When the concentration of chloride is increased, the concentration of halogenated oxygen is increased. When the concentration of nitrogen monoxide is increased, the concentration of peroxy nitrate is increased. When the concentration of hydrogen peroxide water is increased, the concentration of superoxide anion radicals and singlet oxygen is increased, and the efficiency in generating hydroxy radicals is increased. In this manner, it is possible to generate the specific active oxygen species and the redox reaction in accordance with a purpose-oriented use.

In yet another aspect of the invention, in the apparatus for producing water having redox activity water or running water is brought into contact with a catalytic body while radiating electromagnetic waves to the catalytic body and/or applying ultrasonic vibrations to the catalytic body thus allowing water to contain reactive oxygen species. Due to such a constitution, according to the device, by supplying water or running water to a reaction generation reservoir where water having redox activity is generated by radiating electromagnetic waves to the catalytic body and/or by applying supersonic vibrations to the catalytic body, and by allowing free electrons and holes generated in the reaction generation reservoir to react with water or running water efficiently thus producing a large quantity of active oxygen species. Further, by allowing the active oxygen species to react with a dissolved substance in an aqueous solution, water containing active oxygen species is produced. Then, water containing active oxygen species is taken out to the outside of the reaction generation reservoir of water having redox activity, and water containing active oxygen species is conveyed to another place while allowing the water to maintain strong oxidation power so that water containing active oxygen species can perform not only the sterilization of targeted bacteria and the elimination of targeted protozoa but also the decomposition of targeted organic substances.

As a result of generating an in-vivo redox reaction by supplying water containing active oxygen species from the outside of the living organism, it is possible to cause the intracellular degeneration and the individual death so that it is possible to produce water which has not only an excellent sterilizing function and an excellent protozoa eliminating function but also an analysis of various factors relating to a redox reaction of animals and plants such as the induction of a germination signal of plants or a reaction relating to the redox reaction caused by a redox reaction generated by active oxygen species. Further, it is also possible to produce water which has a function of maintaining an organic substance decomposition function for a long period of time.

Accordingly, water containing active oxygen species can realize the sterilization of bacteria, the elimination of protozoa, and the decomposition of organic substances. Further, since the elimination of protozoa is realized, it is also possible to realize the sterilization of *Legionella* proliferated in a body of protozoa such as ameba.

Further, in the apparatus for producing water having redox activity called for in claim 9, the catalytic body is provided in a form of one of fibers, powder or beads. Accordingly, it is possible to produce water having redox activity irrespective of a form of the catalytic body.

In another aspect of the invention, in the apparatus for producing water having redox activity the fibrous catalytic body is configured such that a surface of each of the fibers is covered with a catalytic film having a catalytic function. Accordingly, the catalytic body is efficiently brought into contact with water and hence, free electrons and holes which are generated on a surface of the catalytic body efficiently react with water whereby water containing active oxygen species can be produced.

Further, in another aspect of the invention, in the apparatus for producing water having redox activity the fibers are made of at least one of metal such as aluminum or stainless steel, carbon fibers, glass, ceramics and a non-woven fabric. Accordingly, a surface area of the catalytic body can be increased, and the catalytic body can be manufactured at a relatively low cost so that an apparatus for producing water having redox activity can be manufactured at a low cost.

Further, in yet another aspect of the invention, in the apparatus for producing water having redox activity the catalytic film is mainly made of one kind or a composite of plural kinds of catalytic active substances selected from a group consisting of alumina, titania, zinc oxide, magnesium oxide, magnesium hydroxide, aluminum hydroxide, tungsten oxide, barium titanate, strontium titanate, sodium titanate, zirconium dioxide, molybdenum oxide, hydroxide molybdenum compound, tungsten oxide, hydroxide tungsten compound, $\alpha$-Fe2O3, cadmium sulfide, zinc sulfide, platinum, copper, silver, palladium and the like. Accordingly, it is possible to generate free electrons and holes by radiating electromagnetic waves to a metal-oxide thin film and/or by applying ultrasonic vibrations to the metal-oxide thin film.

Further, in another aspect of the invention, in the apparatus for producing water having redox activity the catalytic film contains the catalytic active substance in a form of a crystalline body or a sintered body, and has a thickness of 30 nm or more. By radiating electromagnetic waves to the catalytic body which is formed by uniformly forming a metal-oxide thin film of 30 nm or more on the substrate and/or by applying ultrasonic vibrations to the catalytic body, it is possible to generate free electrons and holes. Further, by allowing the metal-oxide thin film to ensure a thickness of 30 nm or more, the catalytic body can be used for a long period. Further, even when the thin film is peeled off due to a damage or the like, an alumina sintered body freely float as a relatively large metal piece of sub micron order and hence, the adverse influence of nano-materials on an ecological system and an environment which has been argued recently can be eliminated. Further, the catalytic body can be manufactured at a low cost so that an apparatus for producing water having redox activity can be manufactured at a low cost.

Further, in yet another aspect of the invention, in the apparatus for producing water having redox activity the electromagnetic waves are at least one kind of short-wavelength electromagnetic waves selected from a group consisting of ultraviolet rays, visible beams and microwaves. Accordingly, it is possible to generate active oxygen species from the catalytic body with high efficiency. Further, with the use of microwaves, it is possible to generate free electrons and holes by a catalytic reaction even on a back side of the catalytic body to which light is not radiated.

Further, in another aspect of the invention, in the apparatus for producing water having redox activity the ultrasonic waves are ultrasonic waves of 101 kHz or more and less than 500 kHz generated by an ultrasonic vibrator. In using the middle-frequency ultrasonic waves of 101 kHz or more and less than 500 kHz generated by a middle-frequency ultrasonic vibrator, when the ultrasonic waves impinge on the photocatalytic body, the diffraction property of sound waves is increased so that the agitation of water in a closed vessel is further enhanced whereby free electrons and holes are generated and efficiently separated from the photocatalytic body. Further, an action of the middle-frequency ultrasonic waves brings about a cleaning effect with respect to substances having relatively large molecular weights such as contamination components adhered to the photocatalytic body.

Further, in yet another aspect of the invention, in the apparatus for producing water having redox activity the ultrasonic waves are ultrasonic waves of 500 kHz or more generated by an ultrasonic vibrator. Ultrasonic vibrations of 500 kHz or more generated by the high-frequency ultrasonic vibrator are, usually, used for generating fog by vibrating a gas/liquid interface and hence, a fiber cleaning ability of the ultrasonic vibrations is low. However, the strong cavitation energy of the ultrasonic vibrations directly acts on oxygen atoms dissolved in water and hence, ultrasonic vibrations has enough power of a level which allows not only the generation of the active oxygen species but also the generation of a catalytic reaction on a catalyst film, and scatters the electrons, active oxygen species and the like generated due to the catalytic reaction into water. Accordingly, it is possible to prevent damages on the catalytic body and the deterioration of the catalytic body, and the active oxygen species can be generated with low power and high efficiency.

Further, in another aspect of the invention, in the apparatus for producing water having redox activity, into water or running water which is brought into contact with the catalytic body, at least one kind of oxygen, ozone, chlorine, nitrogen monoxide and ammonia and hydrogen peroxide water is preliminarily mixed while adjusting the dissolved concentration. Accordingly, the efficiency in generating the active oxygen species can be further enhanced. Further, the following characteristic reactions take place. That is, when a quantity of dissolved oxygen is increased, the concentration of superoxide anion radicals is increased. When the concentration of ozone is increased, the concentration of singlet oxygen is increased. When the concentration of chloride is increased, the concentration of halogenated oxygen is increased. When the concentration of nitrogen monoxide is increased, the concentration of peroxy nitrate is increased. When the concentration of hydrogen peroxide water is increased, the concentration of superoxide anion radicals and singlet oxygen is increased, and the efficiency in generating hydroxy radicals is increased. In this manner, it is possible to generate the specific active oxygen species and the redox reaction in accordance with a purpose-oriented use.

Further, in yet another aspect of the invention, the apparatus for producing water having redox activity is configured to vibrate free ends of the fibrous catalytic body by imparting ultrasonic vibrations to the fibrous catalytic body in radiating the electromagnetic waves from the electromagnetic wave source to the fibrous catalytic body thus increasing a flow speed of water which flows while being in contact with a surface of the fibrous catalytic body, whereby the active oxygen species generated by the radiation of the electromagnetic waves to the fibrous catalytic body is diffused in the water which flows on the surface of the fibrous catalytic body thus imparting a function of the active oxygen species to the water, and the water is discharged and taken out from the reaction generation vessel for producing water having redox activity. Accordingly, the active oxygen species can be generated with high efficiency.

Figure 1:
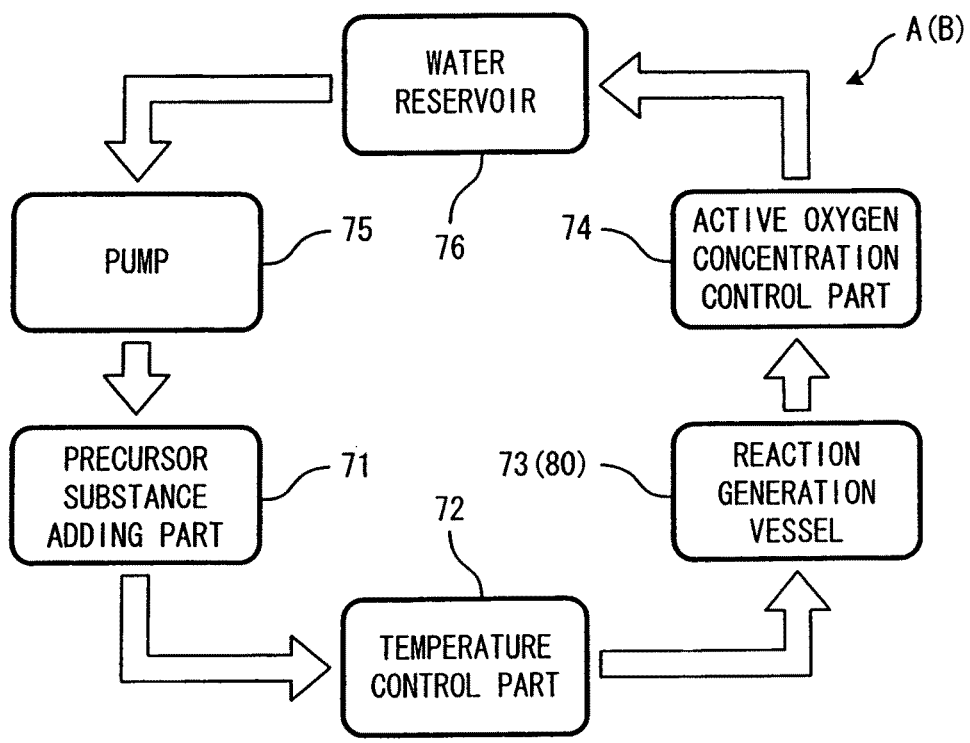
FIG. 1
Figure 1:
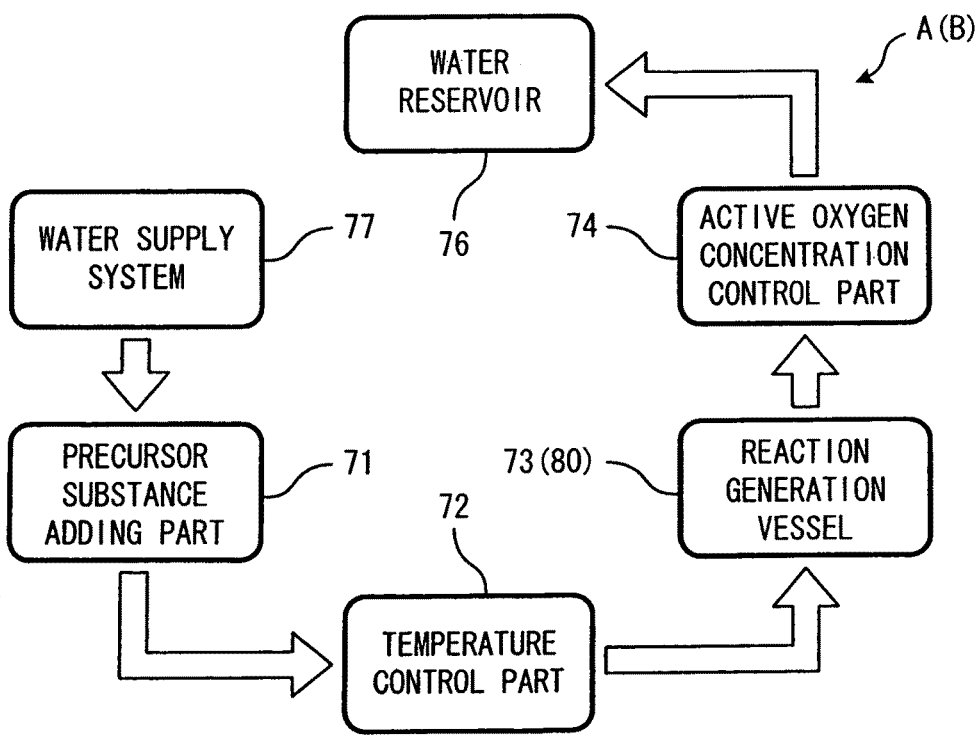
Figure 1:
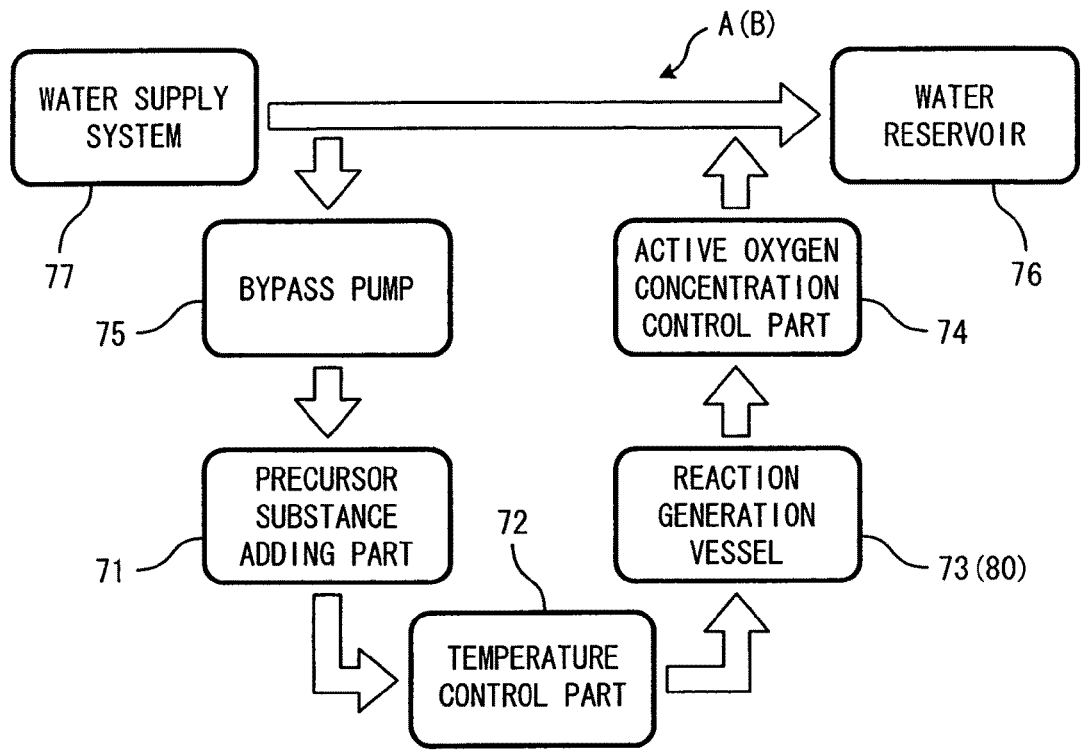
Figure 1:
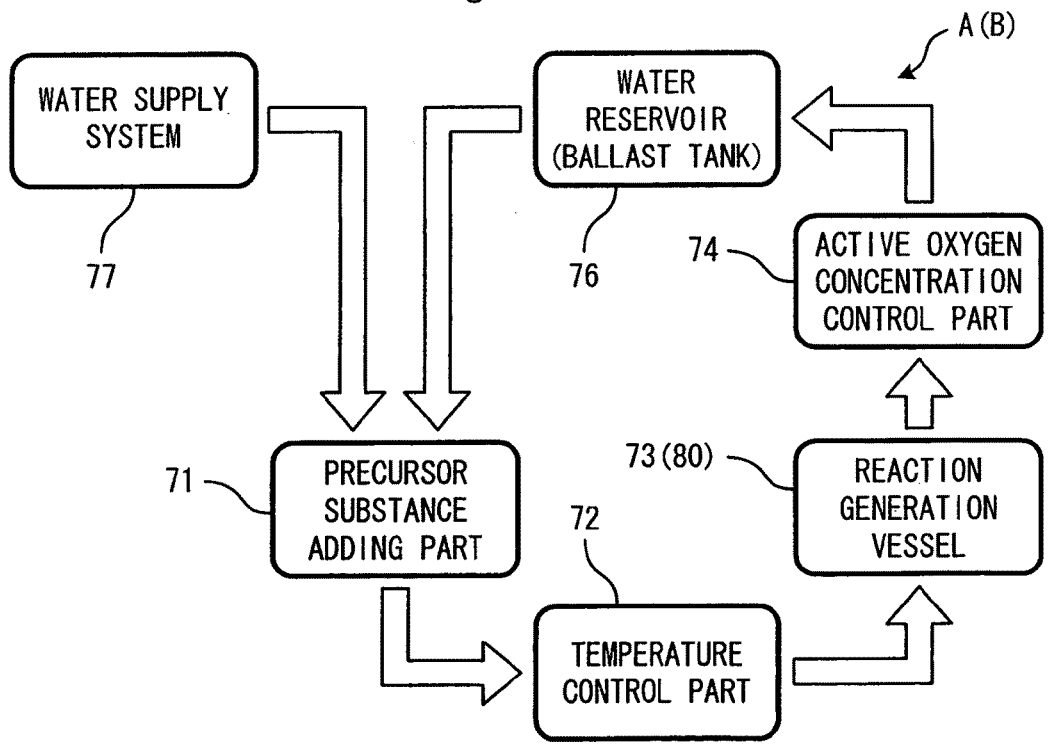

An explanatory view showing a running water circuit pattern of an active oxygen water generation apparatus according to the embodiment.

FIG. 2

A cross-sectional side view of a reaction generation reservoir of the active oxygen water generation apparatus according to the embodiment.

FIG. 3

A cross-sectional plan view of the reaction generation reservoir of the active oxygen water generation apparatus according to the embodiment.

FIG. 4

An explanatory view showing a depth profile of a catalytic body.

FIG. 5

A cross-sectional side view of a reaction generation reservoir of the active oxygen water generation apparatus according to another embodiment.

FIG. 6

A cross-sectional plan view of a reaction generation reservoir of the active oxygen water generation apparatus according to another embodiment.

FIG. 7

An explanatory view showing an ESR spectrum in a DMPO dry distillation experiment.

FIG. 8

An explanatory view showing a change of superoxide anion radicals with time.

FIG. 9

An explanatory view showing the difference in superoxide anion radicals corresponding to a circulation reaction time.

FIG. 10

An explanatory view showing CLA light emission when reaction water is mixed to tobacco cultivation cell floating liquid.

FIG. 11

An explanatory view showing aequorin light emission showing opening/closing of a calcium channel as a redox reaction of active oxygen responsiveness.

FIG. 12

An explanatory view showing aequorin light emission and CLA light emission based on difference in dissolved oxygen concentration.

FIG. 13

An explanatory view showing the generation of peroxy nitrate.

FIG. 14

An explanatory view showing a change concentration of ozone water with time.

FIG. 15

An explanatory view showing the generation of active oxygen by ozone water decomposition.

FIG. 16

An explanatory view showing the generation of singlet oxygen.

FIG. 17

An explanatory view showing ON/OFF comparison of various parameters.

DETAILED DESCRIPTION OF THE INVENTION

The present invention provides advantageous effects which are found in the course of proving the production capacity in the production of water containing active oxygen species. The present invention is characterized in that a reaction relating to the generation of free electrons and holes on a surface of metal oxide which has been conventionally considered as a photocatalytic reaction mainly caused by ultraviolet rays can be broadly generated also by electromagnetic waves and, further, when ultrasonic vibrations are applied to water or running water in a closed reaction vessel, strong cavitation energy is directly applied to oxygen atoms contained in water so that a physicochemical change is given to oxygen atoms whereby the active oxygen species are generated.

To be more specific, the present invention relates to an apparatus for producing water having redox activity and an apparatus for producing water having redox activity which is characterized by the following technical features.

As a reaction precursor substance, at least one kind of oxygen, ozone, chlorine, nitrogen monoxide and ammonia is preliminarily mixed into water or running water while adjusting the dissolved concentration. Free electrons and holes which are generated on an arranged catalytic body due to the radiation of electromagnetic waves to the catalytic body are made to efficiently react with water so that targeted active oxygen species are generated and/or the strong cavitation energy is directly applied to a reaction precursor substance contained in water by applying ultrasonic vibrations to the catalytic body so that a large quantity of active oxygen species is generated. Further, free electrons and holes are generated on the arranged catalytic body and an interface boundary flow speed on a surface of the catalytic body is increased due to the movement of the catalytic body caused by the ultrasonic vibrations and hence, free electrons and holes can be rapidly separated whereby water containing active oxygen species which can maintain activity thereof for a long period is produced. Water containing active oxygen species has the direct bacteria sterilization function and the direct protozoa elimination function, and the direct organic substance decomposition function present in water due to oxygen reduction reaction force. Alternatively or further, an in-vivo redox reaction is generated from the outside of cells such that a receptor stimulus caused by active oxygen species is given to the cells thus generating the in-vivo redox reaction.

Originally, when ultrasonic vibrations are applied to the catalytic body, energy generated due to the ultrasonic vibrations on a gas-liquid boundary surface (water surface) is consumed for atomizing water or is consumed by impinging on internal substances of the catalytic body or for peeling off organic substances or the like adhered to the catalytic body.

However, according to one technical feature of the present invention, in a closed reaction vessel (in a closed space), energy generated by ultrasonic vibrations is not dissipated and is consumed in water and hence, the energy directly acts on oxygen atoms dissolved in water thus generating active oxygen species such as superoxide anion radicals or singlet oxygen.

Further, according to another technical feature of the present invention, by arranging the catalytic body in the inside of the closed reaction vessel, a catalytic reaction which is caused by bringing water or running water into contact with the catalytic body is generated by applying ultrasonic vibrations to the catalytic body and by radiating electromagnetic waves to the catalytic body thus generating active oxygen species. A series of these actions increases the generation of active oxygen species in water caused by the above-mentioned ultrasonic vibrations and brings about a synergistic effect.

Further, electromagnetic waves (particularly indicating microwaves here) directly apply energy to molecules, and are broadly used in a microwave oven which heats food or the like using thermal energy generated due to the direct rotation of water molecules or the like.

Recently, along with the progress of a microwave control technique, it is possible to adjust an output of microwaves so that the application of microwaves to a catalytic body which is arranged in water is minimized to an extent that the elevation of water temperature can be ignored.

Further, according to another technical feature of the present invention, due to the establishment of the above-mentioned verification method, by applying the generation verification means for various active oxygen species to various metal bodies using the similar technique, even with the single use of microwaves which is electromagnetic waves of short wavelength like light, the generation of active oxygen species in water is recognized, and also a synergistic effect of the microwaves and ultrasonic waves is recognized.

Here, active oxygen species are generally called as superoxide, and includes superoxide anion radicals ($O_2.^-$), hydroxy radicals (.OH), singlet oxygen ($^1O_2$), halogenation oxygen ($XO^-$) (hypochlorite ions ($ClO^-$) as an example), nitrogen monoxide radicals (NO.), peroxy nitrate ($ONOO^-.$), organic radicals containing oxygen (phenoxy radicals as an example), excluding hydrogen peroxide water ($H_2O_2$) due to properties thereof.

To allow water to contain active oxygen species as much as possible therein, conventionally, there has been known a method where ultraviolet rays are radiated to a photocatalytic body immersed in water thus diffusing the active oxygen species generated on a surface of the photocatalytic body. According to this method, however, when the ultraviolet-ray permeability of water is low (for example, when suspensions are present in water or water contains ultraviolet-ray absorbing substances), ultraviolet rays which are radiated from an ultraviolet rays source are attenuated before ultraviolet rays radiated from the ultraviolet rays source reach the photocatalytic body by permeating water and hence, there may be a case where a generation quantity of active oxygen species becomes extremely small.

Further, it is thought that a lifetime of active oxygen species existing in water is short in general. For example, superoxide anion radicals which are dissolved in a $KO_2$— crown ether-based organic solvent as a quantitative reagent disappears within an extremely short several milliseconds after being dropped in water.

This implies that active oxygen species become a main cause which, in generating a decomposition reaction or a chemical reaction of organic substances, extremely decreases probability that a reaction substrate such as an organic substance or a chemical substance and active oxygen species react with each other by contact therebetween.

Accordingly, there has been a demand for a method and an apparatus for producing water containing active oxygen species which allow water containing active oxygen species to contain a sufficient quantity of long-lifetime active oxygen species.

To satisfy such a demand, the inventors of the present invention have established a technique in which a catalytic body is arranged in water, and ultrasonic vibrations, ultraviolet rays, a visible light and microwaves are applied to the catalytic body in a single form or in combination as a means for generating active oxygen species in water so as to produce water containing a large quantity of active oxygen species and, further, super oxide anion radicals, singlet oxygen or the like which constitutes active oxygen species is selectively produced.

Water which is brought into contact with the catalytic body may be running water. By bringing running water into contact with the catalytic body, running water downstream of the catalytic body becomes water containing a large quantity of active oxygen species so that it is possible to continuously produce water containing active oxygen species.

Here, as a typical example which generates such reactions, a process where active oxygen species are generated in water is explained by taking an ultraviolet-ray source and a photocatalytic reaction using titania as examples.

Usually, in case of ionized water $H_2O$, oxygen is always dissolved in water except for a peculiar state, and the following reaction is accelerated. However, when the catalytic body is covered with a catalyst film made of a metal oxide film, energy derived from ultraviolet rays (hv) excites metal oxide atoms ($X_nO_m$, for example, such as $TiO_2$, $Al_2O_3$) on a surface of the catalyst film so that free electrons and holes (photon) are generated, and it is thought that the following reaction takes place.

$X_nO_m$(for example, $TiO_2$)+$h\nu \rightarrow e^- + h$+VB $h$+VB$\rightarrow h+tr$ $O_2 + e^- \rightarrow O_2.^-$ $O_2.^- + h$+VB($h+tr$)$\rightarrow O_2$ $OH^- + h$+VB$\rightarrow$OH.

When water contains a large quantity of oxygen, these reactions are accelerated so that a large quantity of $O_2.^-$ (superoxide anion radicals) and OH. (hydroxy radicals) are generated.

Here, when water contains chlorine ions, it is thought that the following reaction is activated.

$$2Cl^- + O_2 + e^- \rightarrow 2ClO^-$$

Further, when water contains a large quantity of ozone, it is thought that the following reaction is activated.

$$O_3 + h\nu \rightarrow O(^1D) + O_2(a^1\Delta_g)$$

$$O_3 + h + VB(h+tr) \rightarrow O_2.-$$

The above-mentioned reactions usually do not efficiently progress with the direct excitation of ozone with the radiation of ultraviolet rays in a UV-A region. However, it is thought that under the presence of the photocatalytic body which is in a light-dependent excited state, the above-mentioned reactions which also bring about the generation of singlet oxygen progress.

The above-mentioned formulae are also expressed by the following three formulae.

$$OH^- + h + VB \rightarrow OH.$$

$$OH. + O_3 O_2 + HO_2$$

$$HO_2 \Leftrightarrow H^+ + O_2.^-$$

The increase of the generation of super oxide and the increase of the generation of singlet oxygen using ozone water as a precursor substance are, as described later, verified by the inventors of the present invention using chemical light emission of Cypridina luciferin analog derived from sea fireflies. The generation of hydroxy radicals which appears in these reactions is also verified by the inventors of the present invention using an electron spin resonance method which makes use of 5.5-Dimethyl-l-pyrroline-oxide (DMPO) as a spin trapping agent.

Further, when water containing a large quantity of nitrogen monoxide gas is provided, ions having strong cellular cytotoxicity are generated due to following reactions.

$$NO + e^- \rightarrow .NO$$

$$NO - e^- \rightarrow NO_2^-$$

$$2NO_2 - 2e^- \rightarrow 2.NO_3^-$$

$$.NO + NO_2^- \rightarrow N_2O_3$$

$$.NO + O_2.^- \rightarrow .ONOO^-$$

$$.ONOO^- + H^+ \rightarrow HOONO \rightarrow OH.$$

The generation of .NO, the generation of .ONOO⁻ and the generation of OH. which take place here are already verified by experiments carried out by the inventors of the present invention using a reaction with fluorescence probes, oxidation assay of folic acid (fluorescence method) and an electron spin resonance method.

Further, these reactions are a group of reactions which are caused only due to the movement of electrons and hence, these reactions are easily reversible whereby the generated secondary reaction ions return to a state before the secondary reaction. Accordingly, active oxygen species which originally have an extremely short lifetime is continuously generated so that it is possible to make active oxygen species to act as if the active oxygen species which have a half life of activity.

In the process for generating water containing active oxygen species, it is considered that various reactive oxygen intermediates (hereinafter referred to as ROI (abbreviation of reactive oxygen intermediates)) contribute to the holding of the activity of active oxygen species for a long period of time. That is, a large quantity of free electrons and holes which are excited on the surface of the catalytic body by electromagnetic waves and ultrasonic vibrations are discharged to an interface between water and the catalyst. As a result, due to molecules which perform the supply and reception of electrons and excitation energy due to a contact of the molecules with a surface of the catalyst, ROI are generated and are stored. Finally, the ROI are transformed into active oxygen species which are detectable. Here, the result of the above-mentioned reactions implies that properties of water are changed into a state where the exchange of free electrons and holes freely takes place although in an unstable manner between so-called free radicals such as ozonide-like radicals, hydrogen peroxide, super oxide anion radicals, peroxy nitrate, lipid peroxide (LOOH, LOO.), halogenation oxygen (ClO⁻), nitrogen monoxide radicals (NO.), and organic radical species containing oxygen and singlet oxygen ($^1O_2$), cyclic peroxide formed of singlet oxygen, hydroperoxide or the like.

Further, in this specification, the above-mentioned water having redox activity implies water containing active oxygen species such as super oxide anion radicals or singlet oxygen excluding hydrogen peroxide at the initial concentration of 1 mmol per 1 L or more. However, at this point of time, there is no marker which simply prescribes the concentration of singlet oxygen and hence, it is assumed that the concentration of singlet oxygen implies titer corresponding to the concentration in terms of the concentration of super oxide anion radicals or the concentration of ozone water.

Assume that the initial concentration of active oxygen species is less than 1 mmol/L, a redox reaction is not induced so that such water containing active oxygen species is not practically used.

Further, in the above-mentioned water containing active oxygen species, by making use of a phenomenon that Cypridina luciferin analog derived from sea fireflies selectively react with super oxide anion radicals and singlet oxygen and exhibits quantitative blue chemical light emission, it is possible to detect super oxide anion radicals (a technique publicly proposed by the inventors of the present invention in Bioluminescence & Chemiluminescence, 2008). Further, the activity of super oxide anion radicals is suppressed with the addition of Tiron which is superoxide removing agent, and super oxide anion radicals are differentiated from singlet oxygen due to an effect of DABCO which is a removal reagent for selective singlet oxygen. Using the method according to the present invention, it is possible to verify that an effect of water containing active oxygen species can be surely obtained outside the apparatus for producing water, and it is also possible to verify that active oxygen species are diffused in water and hold activity thereof so that the reaction continues.

The catalytic body used in the apparatus for producing water having redox activity is not limited in shape, and may be formed into any one of particles, grains, beads and fibers. A surface of each catalytic body is covered with a catalyst film having a catalytic function.

Here, a base material of the catalytic body is not particularly limited, and may be glass, ceramic or non-woven fabric, for example.

A suitable known method may be used to form a catalyst film having a catalytic function on a surface of the catalytic body which is made of such a material. For example, a dip coating method may be used.

The catalyst film formed in this manner may be mainly made of one kind of or a composite constituted of plural kinds of materials selected from a group consisting of catalyst active materials such as alumina, titania, zinc oxide, magnesium oxide, magnesium hydroxide, aluminum hydroxide, tungsten oxide, barium titanate, strontium titanate, sodium titanate, zirconium dioxide, molybdenum oxide, hydroxide molybdenum compound, tungsten oxide, hydroxide tungsten compound, $\alpha$-$Fe_2O_3$, cadmium sulfide, zinc sulfide, platinum, copper, silver and palladium.

By forming the catalyst film made of these materials, it is possible to efficiently generate active oxygen species in water or running water.

Further, the present invention is also characterized in that the catalytic film which forms the catalytic body contains the catalytic active substance in a form of a crystalline body and/or a sintered body, and has a thickness of 30 nm or more. By radiating electromagnetic waves and/or by applying ultrasonic vibrations to the catalytic body which is formed by uniformly forming a metal-oxide thin film of 30 nm or more on a base material, it is possible to generate free electrons and holes. Further, by allowing the metal-oxide thin film to ensure a thickness of 30 nm or more, the catalytic body can be used for a long period. Further, even when the thin film is peeled off due to damage or the like, the catalyst films freely float as relatively large metal pieces of sub micron order and hence, the adverse influence of nano-materials on an ecological system and an environment which has been argued recently can be eliminated. Further, the catalytic body can be manufactured at a low cost so that an apparatus for producing water having redox activity can be manufactured at a low cost.

Further, by forming the catalytic body using the fibers and by forming the base material using at least one of metal such as aluminum or stainless steel, carbon fibers, glass, ceramics and a non-woven fabric, it is possible to increase a surface area of the catalytic body per se and, at the same time, by making use of insulation property and electricity conductive property of the base material, it is possible to generate required active oxygen species in a differentiated manner. For example, the catalytic body may be formed of aluminum fibers, and an alumina film having a film thickness of 30 nm or more may be formed on a surface of the aluminum fibers by sintering by way of a baking step described later which is carried out in two stages. The catalytic body which is formed by collecting the aluminum fiber bodies having the alumina film can, not to mention, efficiently generate active oxygen species by making use of characteristics of alumina which functions as an insulator, and can be formed into a photocatalytic body by applying a titania film on the catalytic body by coating using a dip coating method. Further, when the catalytic body is formed using carbon fibers, minute fiber ends of the carbon fibers having a fern leaf shape are easily vibrated as free ends respectively. Accordingly, it is possible to form the catalyst film on an extremely wide specific surface area by coating and, at the same time, it is also possible to generate free electrons and holes at high efficiency and to discharge them into water and hence, a redox reduction can be induced by generating a large quantity of active oxygen species.

Further, the apparatus for producing water having redox activity may be configured such that a light source of ultraviolet rays which are a kind of microwaves is arranged in water, a catalytic body formed of a fibers surrounds the periphery of the ultraviolet ray light source with a fixed gap therebetween whereby a water flow is formed of a first water flow which ascends or descends by passing through a gap defined between the ultraviolet ray light source and the catalytic body, a second water flow which ascends or descends by spirally passing over the outer periphery of the catalytic body, and a third water flow which flows into or flows out from the tissues of the catalytic body.

Although explained specifically in detail later in conjunction with the drawings, by forming the first water flow which ascends or descends by passing through the gap defined between an inner peripheral surface of the cylindrical catalytic body and the ultraviolet ray light source and the second water flow which circulates spirally on the outer surface of the catalytic body, it is possible to uniformly bring the water flow into contact with the catalytic body. Further, since the catalytic body is formed as a fiber collective body and hence, it is possible to form the third water flow which passes through the inside of the catalytic body from the first water flow and is merged to the second water flow whereby water in the inside of the catalytic body is allowed to flow effectively thus realizing the more effective generation of active oxygen species. Further, the water flow acquires a centrifugal force which makes the water flow directed in the spirally outward direction and hence, it is possible to forcibly move turbid substances in water toward an outer periphery of the reaction vessel whereby it is possible to form a region where the clarity is relatively high at a central portion of the water flow thus allowing energy generated by electromagnetic wave source to efficiently reach the catalytic body.

To explain advantageous effects obtained by the ultrasonic vibrator used here, the ultrasonic vibrator performs not only the excitation of free electrons and holes on the catalytic body but also minute vibrations of the catalytic body. Due to such minute vibrations of the catalytic body, the free electrons and the holes which are generated by a catalytic reaction are discharged into water from the catalytic body so that the generation of active oxygen species can be smoothly conducted thus allowing the active oxygen species to float in water freely.

That is, with respect to a flow speed of water which flows on a surface of the catalytic body, fibers move at an ultra high speed due to ultrasonic vibrations and hence, an interface boundary flow speed is remarkably enhanced thus realizing the discharge of active oxygen species into water.

That is, these ultrasonic waves accelerate the separation of active oxygen species from the catalytic body and, at the same time, always brings an area on the catalytic body into an electrically stable state and hence, a further catalytic reaction is generated and the reaction is amplified due to a mutual interference action in wavelength between ultrasonic waves and electromagnetic waves.

With respect to the ultrasonic vibrator, for example, the use of atomization ultrasonic vibrator (high-frequency ultrasonic vibrator) which generates high-frequency ultrasonic waves (in general, 500 kHz or more) is recommended.

The high-frequency ultrasonic vibrations generated by this atomization ultrasonic vibrator may exhibit low fiber cleaning ability. However, the strong cavitation energy of the ultrasonic vibrations directly acts on oxygen atoms dissolved in water and hence, ultrasonic vibrations have enough power of a level which allows not only the generation of the active oxygen species but also the generation of a catalytic reaction on a catalyst film, and scatters the electrons, active oxygen species and the like generated due to the catalytic reaction into water.

Further, the middle-frequency ultrasonic waves (101 to 500 kHz) may be used as the ultrasonic waves. In using the middle-frequency ultrasonic waves generated by the middle-frequency ultrasonic vibrator, when the ultrasonic waves impinge on the fibrous catalytic body, the diffraction property of sound waves is increased so that the agitation of water in a closed vessel is further enhanced whereby active oxygen species are efficiently separated from the catalytic body. In this case, it is deniable that the deterioration of the catalytic body is increased compared to the high frequency vibrator. However, an action of the middle-frequency ultrasonic waves can bring about an effect of cleaning substances having a relatively large molecular weight such as turbid components adhered to the catalytic body.

However, the low-frequency ultrasonic waves of 100 kHz or less may cause the deformation of the catalytic body or peeling or damage on a catalyst reaction surface formed on the catalytic body, and the active oxygen species generation efficiency is also poor and hence, the use of the low-frequency ultrasonic waves is not so desirable.

Further, it may be also possible to produce a reactant with the desired active oxygen species by preliminarily mixing a predetermined gas into water or running water which is brought into contact with the catalytic body as described previously.

That is, in a state where a catalytic reaction of the catalytic body is not imparted to water or running water, an oxygen gas, an ozone gas, a chlorine gas, a nitrogen monoxide gas, an ammonia gas or a hydrogen peroxide is mixed into water or running water so as to generate various active oxygen species such as super oxide anion radicals, hydroxy radicals, singlet oxygen, hydrogen peroxide water ($H_2O_2$), hypochlorous acid ions ($ClO^-$), nitrogen monoxide radicals (NO.) or peroxy nitrate ($ONOO^-$.) in water or running water.

Further, it may be also possible to control activity of active oxygen species by applying chemical treatment and/or physical treatment to water having redox activity.

To be more specific, it is possible to control the activity of active oxygen species by adjusting additives, dissolved oxygen concentration, dissolved ozone concentration, temperature, pH, viscosity or the like in water or running water which is brought into contact with the catalyst.

A quantity of active oxygen in water having redox activity is reduced with a fixed half-life as described previously. According to the present invention, by providing an active oxygen concentration control part to the apparatus for producing water containing active oxygen species, it is possible to change a decreasing speed of active oxygen species concentration.

Further, the inventors of the present invention have found that the dissolved oxygen concentration is lowered along with the elevation of water temperature, and when water with increased dissolved oxygen concentration is left, the oxygen concentration is reduced with time but, at the same time, activity (concentration) and lifetime (activity generation holding time) of the active oxygen species are changed corresponding to a change in the dissolved oxygen concentration, temperature and pH in water. Further, the inventors of the present invention have clarified a phenomenon where $10^{-7}$ to $10^{-8}\%$ of oxygen dissolved in water usually always contains superoxide anion radicals, and also have found that the apparatus for producing water containing active oxygen species allows the active oxygen species to exhibit strong oxidation power by changing a content ratio of dissolved oxygen to $10^{-4}$ to $10^{-6}\%$.

That is, the dissolved oxygen concentration, water temperature and pH are deeply relevant to the active oxygen species generating ability. For example, here established is the following active oxygen concentration control method. In this method, for example, water which is fed to the apparatus for producing water containing active oxygen species is preliminarily separated into acidic water and alkaline water by an ionization decomposition method. Only alkaline water is cooled and oxygen is given to alkaline water and, thereafter, alkaline water is introduced into the apparatus for producing water containing active oxygen species. Then, alkaline water is introduced into a treatment vessel which is provided for the sterilization of bacteria, the elimination of microorganisms and the decomposition of organic substances, and treatment is applied to alkaline water for a fixed time. Thereafter, stored acidic water is added to alkaline water thus remarkably shortening lifetime of active oxygen species.

The above-mentioned control method and change of concentration are characteristic features when an oxygen gas is supplied to a gas adding device for dissolving the gas in water. The same phenomenon is generated when an ozone gas, a chloride gas, a nitrogen monoxide gas or an ammonia gas is used as a kind of addition gas.

Further, the active oxygen concentration control part may include, as a means which adjusts a decreasing speed of concentration of active oxygen species, a chemical means which performs treatment such as the adjustment of the dissolved ion concentration (for example, copper ions, aluminum ions, iron ions or the like), the adjustment of pH of an aqueous solution, or addition of chemicals such as a super-oxide remover (Tiron or the like) or a physical means such as a pressure reduction device in a gas phase, a reservoir temperature control device.

Since the apparatus for producing water containing active oxygen species includes the active oxygen concentration control part, with respect to water containing active oxygen species generated by the apparatus for producing water containing active oxygen species, during a period where the activity of active oxygen according to the present invention is requested, it is possible to slow down a decreasing speed so as to maintain active oxygen at high concentration by holding a pressure in a gas phase at a high level or by holding a temperature of the reservoir at a low level. Thereafter, it is possible to increase the decreasing speed by reducing a pressure in gas phase using a vacuum pump or by elevating the reservoir temperature to a high temperature using an active oxygen concentration control part, for example.

In increasing the decreasing speed, a active oxygen species removing agent such as Tiron, DABCO or a reducing agent such as a thiol group may be added to water containing active oxygen species to realize the rapid removal of active oxygen species.

Such a reactive oxygen concentration control brings about an advantageous effect that the activity of water containing active oxygen species is increased only during a predetermined period and, thereafter, water containing active oxygen species is brought back to an inactive state to become ordinary water. With the use of the physical means, it is possible to minimize the influence of residual substances on an environment compared to a case where the chemical means is used. As the physical means, besides an atmospheric pressure operating means such as the vacuum pump or the water temperature control device described above, a water pump, a device which performs agitation by aeration, an electrically neutralizing device or the like is available.

By mounting the active oxygen concentration control part on the apparatus for producing water containing active oxygen species described in detail later as an attachment, the apparatus for producing water containing active oxygen species can acquire the compact constitution. However, the arrangement of the active oxygen concentration control part is not limited to the above arrangement and, for example, the apparatus for producing water containing active oxygen species and the active oxygen concentration control part may be provided separately from each other such that the active oxygen concentration control part is arranged in a water flow passage of active oxygen containing water.

Further, in addition to the previously-mentioned ultrasonic vibrator which is arranged on the apparatus for producing water containing active oxygen species and promotes the generation of active oxygen, an ultrasonic vibrator which generates ultrasonic waves for attenuating ultrasonic waves generated from the above-mentioned ultrasonic vibrator (hereinafter referred to as attenuation ultrasonic vibrator) may be arranged so as to adjust a generation quantity of active oxygen.

That is, the frequency of ultrasonic waves generated from the attenuation ultrasonic vibrator is set to frequency which can attenuate energy generated from the ultrasonic vibrator by interference with the ultrasonic waves generated from the ultrasonic vibrator.

Due to such a constitution, it is possible to adjust a generation quantity of active oxygen by suitably adjusting an electric current which flows in the ultrasonic vibrator and an electric current which flows in the attenuation ultrasonic vibrator.

Further, since the generation quantity of active oxygen can be electrically adjusted, it is possible to adjust the generation quantity of active oxygen more finely compared to the adjustment using chemicals.

Further, water having redox activity means the above-mentioned water containing active oxygen species. In this specification, water having redox activity particularly means such water containing active oxygen species such as superoxide anion radicals or hydroxy radicals at the initial concentration of 1 mmol per 1 L or more.

Active oxygen species possess extremely strong oxidation power and hence, active oxygen species are mainly used for sterilization and an insect control such as the elimination or the sterilization of microorganism, the extermination of parasitic organisms adhered to fish (insect control), ballast water treatment, water purification, cleaning of foods, vegetable and the like, cleaning of instrument, floor surfaces or the like. Further, active oxygen species are also applicable to all fields which require the decomposition of organic substances.

Further, active oxygen species also function as an elicitor for budding of plants or an embryo finding factor of anterialization of human body or manifestation of cancer cells and hence, active oxygen species are utilized in an agriculture related field or a medical field in a non-limited manner and, further, these usages are not limited.

The treatment method using water having redox activity is not particularly limited provided that microorganism (bacteria, protozoa or the like) which becomes an object to be treated with water containing active oxygen species or organic substances are brought into contact with water containing active oxygen species. The treatment may be performed such that microorganisms or organic substances are supplied to an apparatus for producing water containing active oxygen species together with water, and microorganisms or organic substances are brought into contact with active oxygen species or ion species in the inside of the apparatus.

Further, the apparatus for producing water having redox activity may constitute a cleaning system in which the produced water containing active oxygen species is brought into contact with an object to be cleaned. In this case, the device can perform the decomposition of organic substances in addition to elimination and sterilization of bacteria so that the device can eliminate physical contamination such as contamination observed with naked eyes, not to mention, microbial contamination.

As the object to be cleaned here, for example, an artificial teeth, medical equipment, tableware, vegetable, precision instrument, a toilet, cloth, rice seed and the like may be named. However, the object to be cleaned is not particularly limited to these objects.

Further, active oxygen species possess extremely high reactivity and hence, active oxygen species can transform a predetermined chemical substance into other substance by oxidation or generates a decomposition reaction. It is thought that active oxygen species are also applicable to a reaction which makes a predetermined substance (for example, a fumaric acid, dioxins, trihalomethane) harmless.

However, to allow active oxygen species to generate the above-mentioned decomposition of organic substances or a chemical reaction, a sufficient quantity of active oxygen species is contained in water (the concentration of a level that at least active oxygen species of initial concentration of 50 nmol/L or more are contained in water).

Assume that the initial concentration of active oxygen species is 1 mol/L, the response of the above-mentioned redox reaction is not generated, and the reaction is finished without inducing an operation of an intracellular information transmission path so that the targeted redox activity cannot be induced. Further, a decomposition reaction of organic substances or a chemical reaction is extremely slow so that active oxygen species of such concentration is not suitable for practical use.

With the use of an artificial lung as the above-mentioned precursor adding device for preliminarily mixing a predetermined gas, it is possible to maintain the concentration of a dissolved gas at a fixed value or at the particular gas concentration. Further, by adjusting a flow rate of an addition gas to be supplied to the artificial lung, it is possible to lower the concentration of carbon dioxide or a nitrogen gas dissolved in water.

An artificial heart-lung machine is used in a recovery period of a cardiac surgery patient or a heavy cardiac incompetency patient. However, the artificial heart-lung machine requires improvement to be used as a biomaterial. That is, active oxygen species are generated when a circuit and blood are brought into contact with each other or a gas is exchanged and hence, the manner how an inflammation inducing action caused by an action of active oxygen species on a human body is lowered becomes a task to be solved in future.

As a model for evaluating performances of a biomaterial, the following experiment device is used in a diverted manner. Further, by mixing ozone, sulfur oxide, nitrogen oxide, hydrocarbon inclusion gas, volatile organic substances, nitrogen, a carbon dioxide gas, a carbon monoxide gas, air or the like as a kind of gas to be added, the following experiment device is used in a diverted manner as an environment experiment model.

Hereinafter, the apparatus for producing water having redox activity according to this embodiment is further explained in detail in accordance with following items.
[Overall constitution of apparatus for producing water having redox activity]
[Specific constitution of reaction generation vessel]
[Specific constitution of reaction generation vessel according to another embodiment]
[Verification experiment]
 [Verification experiment 1: confirmation of generation of hydroxy radicals]
 [Verification experiment 2: confirmation of generation of superoxide anion radicals]
[Verification experiment 2a: confirmation of generation of superoxide anion radicals in water producing apparatus A]
[Verification experiment 2b: confirmation of generation of superoxide anion radicals in water producing apparatus B]
[Verification experiment 3: Evaluation of redox activity]

[Verification experiment 4: Confirmation of ion path which also is brought about by the disappearance of hypochlorous acid and hydrogen peroxide]
[Verification experiment 5: Verification of generation of peroxide nitrate]
[Verification experiment 6: Confirmation of generation of singlet oxygen]
[Verification experiment 7: Verification of redox activity of active oxygen species induced by microwaves]
[Verification experiment 8: Comparison of generation of active oxygen species when parameters are changed]
[Overall Constitution of Apparatus for Producing Water Having Redox Activity]

The water producing apparatus A according to this embodiment (simply referred to as "water producing apparatus A" hereinafter) is constituted of a water flow circuit provided with a reaction generation vessel 73 for producing water having redox activity by generating active oxygen species in water.

This water flow circuit may be a circulation system which circulates water by way of the reaction generation vessel 73 or a one-path system which discharges supplied water as water having redox activity without circulating the supplied water.

The water producing apparatus A includes a precursor adding part 71 which adds a precursor substance to water and, for example, oxygen, ozone, chlorine, nitrogen monoxide, ammonia, hydrogen peroxide may be added as the precursor substrate in water.

Further, the water producing apparatus A includes a temperature control part 72 which adjust a temperature of water to a predetermined temperature. The temperature may be adjusted to a temperature suitable for the generation of active oxygen species, for example, within a range of 4° C. to 40° C. depending on a usage.

Further, the water producing apparatus A includes a reactive oxygen concentration control part 74 which adjusts a quantity of active oxygen species contained in produced water having redox activity, and may produce water having redox activity which is set to desired reactive oxygen concentration. This reactive oxygen concentration control part 74 may be constituted of a chemicals adding device which adds a reactive oxygen removal agent to water having redox activity or a water temperature adjusting device which adjusts a temperature of water having redox activity.

Further, the water producing apparatus A may include a pump 75 for supplying water, and a reservoir 76 which reserves produced water having redox activity.

The above-mentioned water producing apparatus A may be a water producing apparatus A which can efficiently produce water having redox activity by forming the water flow circuit shown in FIG. 1, for example.

Firstly, FIG. 1(a) shows an example where the water producing apparatus A is constituted as a circulation system. In the water producing apparatus A shown in FIG. 1(a), water which is preliminarily reserved in the reservoir 76 described at the center of the drawing is circulated in the inside of the water producing apparatus A thus gradually transforming water into water having redox activity.

To be more specific, water stored in the reservoir 76 is supplied to the precursor substance adding part 71 by the pump 75. Water to which the precursor is added by the precursor substance adding part 71 is supplied to the temperature control part 72 and is subject to temperature adjustment and, thereafter, is supplied to the reaction generation vessel 73.

In the reaction generation vessel 73, active oxygen species are added to the supplied water thus producing water having redox activity. Here, a reactive product derived from the precursor contained in water and active oxygen species are also contained in water having redox activity.

Water having redox activity which is produced in this manner is supplied to the active oxygen concentration control part 74 where the active oxygen concentration is adjusted and, thereafter, water returns to the reservoir 76 again.

According to such a water producing apparatus A, active oxygen species can be stored in water reserved in the reservoir 76 thus producing water having redox activity which contains active oxygen species of relatively high concentration.

Further, in the water producing apparatus A shown in FIG. 1(a), the water flow circuit is constituted of the circulation system and hence, it is preferable to produce water for cleaning vegetables or water having redox activity of high concentration. For example, in using water produced by the water producing apparatus A in cleaning vegetables, vegetable may be immersed into water in the reservoir 76 or water having redox activity which is reserved in the reservoir 76 is sprayed into atmosphere using an atomizer not shown in the drawing and vegetables may be subject to sprayed water having redox activity separately.

Next, FIG. 1(b) shows an example where the water flow circuit is constituted of an one-path system in the water producing apparatus A. The example shown in FIG. 1(b) has the substantially same constitution as the above-mentioned circulation system explained in conjunction with FIG. 1(a). However, this example differs from circulation system with respect to a point that the water supplied from the water supply system 77 is eventually discharged to the reservoir 76, and is not circulated in the inside of the water producing apparatus A.

Here, the water supply system 77 may be a system which supplies water like waterworks or a pump system which supplies discharge water or the like.

Assuming that the water supply system 77 is waterworks, for example, the water producing apparatus A constituted of the one-path system is suitable for producing water having redox activity which exhibits low active oxygen species concentration compared to the above-mentioned water producing apparatus A constituted of the circulation system.

Further, for example, when the discharge water containing ozone is supplied from the water supply system 77, ozone in the discharge water is efficiently decomposed so that the discharge water is transformed into water having redox activity which exhibits imparts a low load to an environment thus enabling the waste water treatment.

Further, for example, the water supply system 77 may be constituted of an ozone water producing apparatus where ozone water is supplied to a flow water circuit, and ozone contained in ozone water is transformed into singlet ozone so that water having redox activity which contains an abundant quantity of singlet oxygen can be produced.

Next, FIG. 1© shows an example where, in the water producing apparatus A, the water flow circuit is constituted of a one-path system different from a one-path system shown in FIG. 1(b). That is, although the example shown in FIG. 1(b) has the substantially same constitution as the above-mentioned one-path system explained in conjunction with FIG. 1(b), this example differs from the above-mentioned one-path system with respect to a point that some of water supplied from the water supply system 77 is directly discharged to the reservoir 76.

This water producing apparatus A which directly discharges some of supplied water to the reservoir 76 is more suitable in producing water having redox activity with active oxygen species concentration lower than active oxygen species concentration in the water producing apparatus A constituted of the one-path system explained in conjunction with the above-mentioned drawing (FIG. 1(b)).

Next, FIG. 1(d) shows an example where, in the water producing apparatus A, the water flow circuit is constituted of a circulation system different from the circulation system shown in FIG. 1(a). That is, although the example shown in FIG. 1(d) has the substantially same constitution as the above-mentioned circulation system explained in conjunction with FIG. 1(a), this example differs from the above-mentioned one-path system with respect to a point that water is additionally supplied to water having redox activity which circulates in the inside of the water producing apparatus A from the water supply system.

The water producing apparatus A in which water is additionally supplied from the water supply system is suitable for eliminating living organisms contained in ballast water of a ship, for example.

To be more specific, by arranging the water producing apparatus A on the ship and by using a ballast tank on the ship as the reservoir 76, it is possible to efficiently sterilize living organisms contained in ballast water in the ballast tank.

Next, the reaction generation vessel 73 which constitutes a part of the water producing apparatus A according to this embodiment is explained in more detail.

[Specific Constitution of Reaction Generation Vessel]

Figure 2:
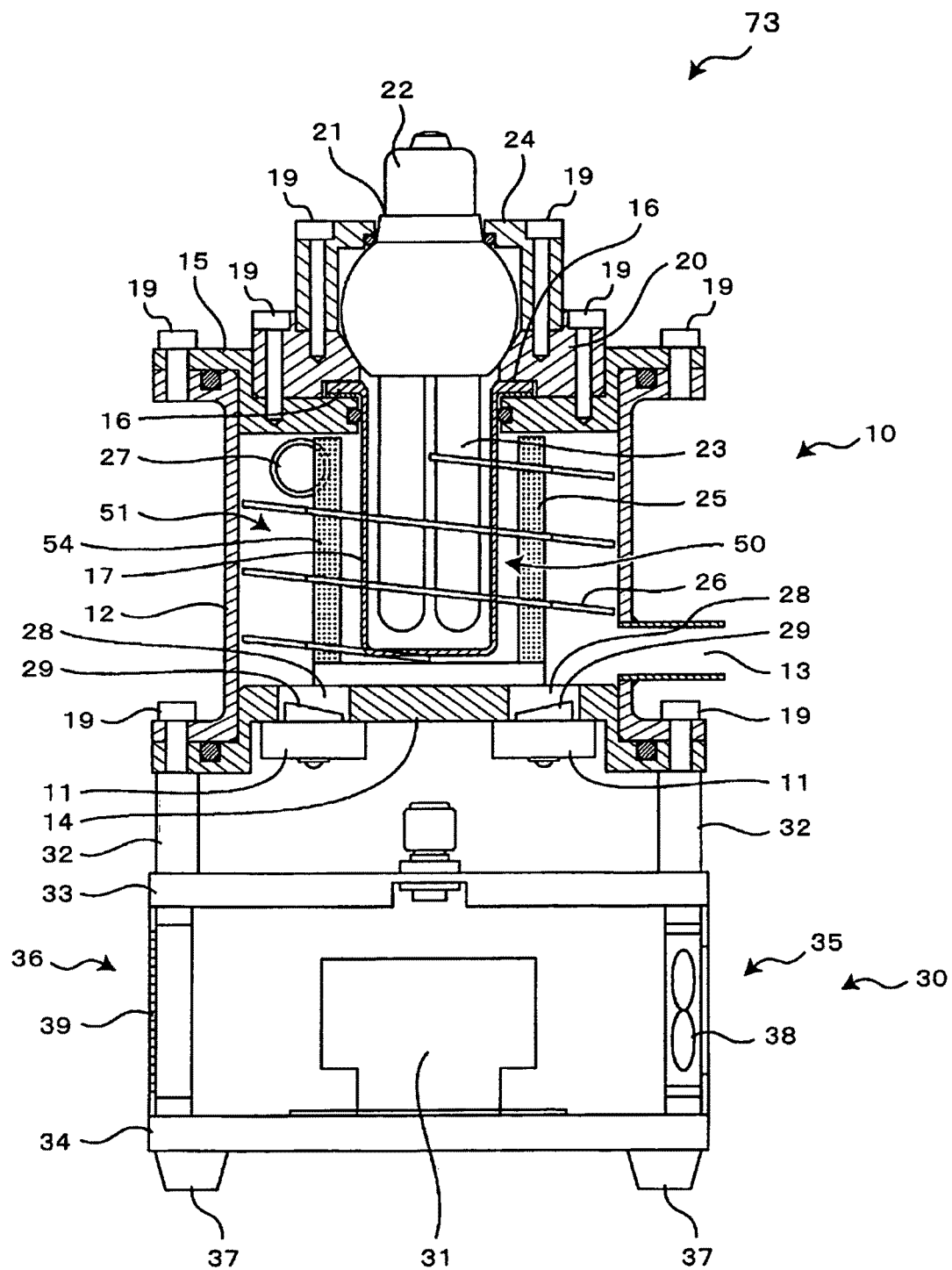
Figure 3:
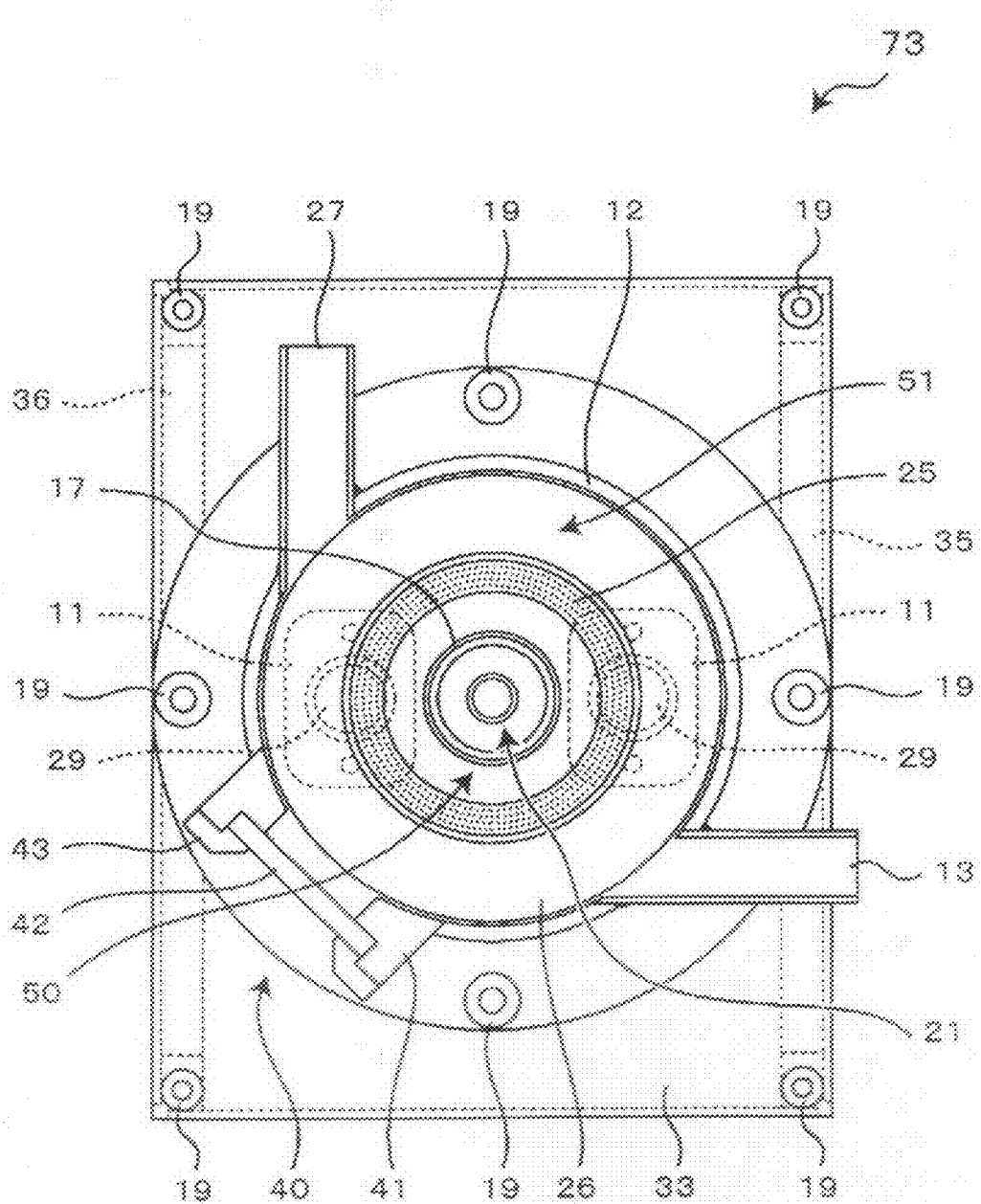

Firstly, the reaction generation vessel 73 used in the water producing apparatus A according to this embodiment is explained in conjunction with FIG. 2 and FIG. 3. FIG. 2 is a cross-section side view of the reaction generation vessel 73, and FIG. 3 is a cross-sectional plan view of the reaction generation vessel 73.

The reaction generation vessel 73 is provided for producing water having redox activity by supplying water (running water) to the reaction generation vessel 73 and by allowing water to contain active oxygen species. The reaction generation vessel 73 is constituted of a reaction part 10 provided with water flow passages, and a control part 30 which controls driving of ultrasonic vibrators 11 mounted on the reaction part 10.

The reaction part 10 includes an approximately-cylindrical reaction-part outer sleeve 12. A water inlet which constitutes a port for receiving water (running water) and a water outlet 27 which constitutes a port for discharging water having redox activity are formed in the reaction-part outer sleeve 12. A bottom opening formed in the reaction-part outer sleeve 12 is closed by a reaction-part bottom plate 14, and an upper opening of the reaction-part outer sleeve 12 is covered with a cell-body engaging member 15.

Further, also as shown in FIG. 2, a naked-eye viewing window 40 is formed on an outer peripheral surface of the reaction-part outer sleeve 12 such than an operator can observe a state in the reaction-part outer sleeve 12.

It is needless to say that the formation of the naked-eye viewing window 40 is unnecessary depending on a usage of the water producing apparatus A.

The naked-eye viewing window 40 is formed as follows. A window frame body 41 in which a hole having a predetermined shape is formed is arranged in a partially cutaway portion of an outer peripheral surface of the reaction-part outer sleeve 12, a transparent plate 42 made of a transparent material such as glass or an acrylic resin is fitted into the window frame body 41 so as to close the hole, and the transparent plate 42 is fixed by a transparent-plate-pushing body 43 from the outside.

Firstly, an area in the vicinity of an upper portion of the reaction-part outer sleeve 12 is explained. The cell-body engaging member 15 has an approximately doughnut shape by forming a hole in a center portion thereof as viewed in a plan view, and the cell-body engaging member 15 is fixed to the reaction-part outer sleeve 12 using bolts 19.

Into the hole formed in the cell-body engaging member 15, a cup-shaped cell body 17 which is formed using a transparent material and has a flange portion 16 is fitted. To be more specific, the cell body 17 is fitted into the hole such that the cell body 17 is inserted into the reaction-part outer sleeve 12 through the hole formed in the center of the cell-body engaging member 15 and the flange portion 16 is engaged with a peripheral end portion of the hole of the cell-body engaging member 15.

The cell body 17 is made of a material having high transmission efficiency of the electromagnetic wave, and is made of silica glass, for example.

Further, a packing 18 formed of an elastic body is arranged on an inner wall surface of a hole formed in the cell-body engaging member 15. The packing 18 closes a gap defined between the inner wall surface of the hole formed in the cell-body engaging member 15 and the cell body 17 thus preventing water (running water) from leaking to an upper portion of the cell body 17.

Further, the flange portion 16 of the cell body 17 is sandwiched between a cell body holding member 20 and the cell-body engaging member 15 thus restricting the upward movement of the cell body 17. Here, the cell body pushing member 20 is fixed to the cell-body engaging member 15 using the bolts 19.

Further, an electromagnetic-wave-generation-device insertion hole is formed in a center portion of the cell body holding member 20 so that the cell body holding member 20 has an approximately doughnut shape as viewed in a plan view. Here, an electromagnetic wave generation device 21 can be inserted into the electromagnetic-wave-generation-device insertion hole.

In the reaction generation vessel 73, an ultraviolet ray tube (blacklight, effective wavelength of ultraviolet rays: 356 nm) having a shape which is generally called as a bulb-shaped fluorescent lamp is shown as one example of an electromagnetic wave generation device 21. The electromagnetic wave generation device 21 may be a bactericidal lamp (effective wavelength of ultraviolet rays: 256 nm), and may be an electromagnetic wave generation device used in a microwave oven or the like.

By connecting a bulb socket or the like to an electricity supply part 22 formed on an upper portion of the electromagnetic wave generation device 21 and by supplying electricity to the electromagnetic wave generation device 21, electromagnetic waves are radiated from the electromagnetic wave generation device 21.

Further, the electromagnetic wave generation device 21 is inserted into the electromagnetic-wave-generation-device insertion hole thus allowing a tube part 23 of the electromagnetic wave generation device 21 to face the inside of the cell body 17 whereby the electromagnetic waves can be radiated to the inside of the reaction-part outer sleeve 12 through the cell body 17.

Further, the electromagnetic wave generation device 21 is connected to the cell body holding member 20 using an electromagnetic-wave-generation-device fixing member 24, and the cell body holding member 20 and the electromagnetic-wave-generation-device fixing member 24 are fixedly connected to each other using bolts 19.

Due to such a constitution, for example, even in a state where water is supplied to the reaction generation vessel 73, it is possible to exchange the electromagnetic wave generation device 21 without stopping the supply of water.

Next, the inner structure of the reaction-part outer sleeve 12 is explained. A catalytic body 25 which is formed in a cylindrical shape and surrounds an outer peripheral surface of the cell body 17 is arranged in the inside of the reaction-part outer sleeve 12, and a helical plate 26 which is formed into a helical shape along an inner wall surface of the reaction-part outer sleeve 12 is formed around an outer periphery of the catalytic body 25.

A first water flow passage 50 which allows water to flow in the vertical direction is formed between the outer peripheral surface of the cell body 17 and the inner peripheral surface of the catalytic body 25.

Further, in a space defined between the outer peripheral surface of the catalytic body 25 and the inner peripheral surface of the reaction-part outer sleeve 12, the helical plate 26 is formed such that the helical plate 26 turns around the outer peripheral surface of the catalytic body 25 in plural turns thus forming a second water flow passage 51 which constitutes a flow passage for a second water flow in which water flows in a spirally elevated manner along the helical plate 26.

The catalytic body 25 is formed of fibers each having a diameter of approximately 50 to 200 mm (100 mm in this embodiment). Although the fibers are explained in detail later, various fibers such as fibers which are formed by sintering an alumina coating film on surfaces of aluminum fibers or fibers coated with a titania film which are formed by sintering an alumina coating film on surfaces of the aluminum fibers may be used. Kinds or quantities of fibers can be changed corresponding to the usages. Further, the catalytic body may be a body formed of granular beads. In this case, to prevent the beads from flowing out to the outside of the reaction generation vessel due to water flow, beads are put into a mesh-like bag and are formed into a cylindrical shape thus allowing the body formed of granular beads to surround the electromagnetic wave line source. As fibers used as the fibrous of this embodiment, it is possible to adopt fibers which can carry a catalytic film such as glass fibers, ceramic fibers, carbon fibers thereon.

The catalytic body 25 may be formed into a steel-wool-like form or a non-woven form by irregularly collecting these fibers, or may be formed by regularly collecting these fibers.

Further, the catalytic film is not limited to alumina, and may be made of one kind of catalytic active substance or a composite constituted of plural kinds of catalytic active substances selected from a group consisting of titania, zinc oxide, magnesium oxide, magnesium hydroxide, aluminum hydroxide, tungsten oxide, barium titanate, strontium titanate, sodium titanate, zirconium dioxide, molybdenum oxide, hydroxide molybdenum compound, tungsten oxide, hydroxide tungsten compound, $\alpha$-$Fe_2O_3$, cadmium sulfide, zinc sulfide, platinum, copper, silver, palladium and the like. Further, a catalytic body is formed by selecting highly-active and highly-functional metal oxide corresponding to strength of required redox activity. To take titania as an example, as a mutant of a structural body of titania, rutile-type titania which can respond to a visible light such as a sulfur doped body or nitrogen doped body is produced.

Particularly, in a case where a catalytic film is formed on a surface of the catalytic body using fibers made of a material other than metal such as carbon fibers, glass or ceramics (ceramics in case of alumina fibers) as a carrier, a vacuum deposition method or a dip coating method may be adopted, for example.

The catalytic body 25 used in this embodiment is a unique catalytic body which is formed by a following manufacturing method uniquely originated by inventors of the present invention. That is, an alumina coating film is formed on a surface of aluminum fibers in which aluminum fibers are sintered by heating by baking the alumina film in multiple stages under an atmospheric environment.

Here, as the aluminum fibers which constitute the carrier, for example, a metal containing No. 1000 to No. 7000 aluminum (hereinafter also simply referred to as "aluminum") can be preferably used. Here, "aluminum" is a concept which includes pure aluminum, not to mention, and also includes so-called an aluminum alloy in general.

The alumina coating film may be formed by heating metal containing aluminum which constitutes a carrier up to a predetermined temperature at a rate of 5° C./min or less and, thereafter, by heating the metal to a temperature immediately below a melting point of the metal-made fibers (−5% K of a melting point).

Further, the alumina coating film may be formed through two-stage baking processing. That is, the alumina coating film may be formed as follows. The aluminum film may be formed by heating aluminum fibers by baking for a predetermined time such that aluminum fibers having a diameter of approximately 100 mm are heated to a temperature (K) which is approximately two third of a melting point while maintaining a temperature gradient of 5° C. per minute or less and, thereafter, by heating the aluminum fibers by baking such that the aluminum fibers are heated to a temperature near the melting point (temperature lower than the melting point by −5% K).

By forming the alumina coating film in the above-mentioned manner, it is possible to efficiently form the alumina coating film having a scaly surface which exhibits a peculiar shape in appearance on the aluminum fibers. Further, this step is not limited to aluminum in a fiber form. The substantially same film can be formed also with respect to aluminum in a plate form.

For example, in a case where No. 1050 aluminum fibers are used, a melting point of No. 1050 aluminum fibers is 933.47K. Accordingly, the temperature used in the first stage is 653.4 (approximately 380° C. in terms of Celsius), and the temperature used in the second stage which is immediately below the melting point is 886.79K (approximately 614° C. in terms of Celsius in the same manner).

By further heating the metal-made fibers to a melting point of aluminum-based metal which constitutes the metal-made fibers or more, it is possible to form an extremely-stabilized oxide film on the metal-made fibers.

The catalytic body formed in this manner (here, catalytic body obtained by forming the alumina coating film on the surface of the aluminum fibers) can maintain a fiber form even when the temperature of the catalytic body is elevated to a temperature near a melting point of alumina and hence, the catalytic body can also function as a catalyst having the excellent active oxygen generation ability.

Particularly, by forming an alumina coating film having a film thickness of 100 nm or more on the aluminum fibers by sintering (by forming the dense structure by baking), the catalytic body can exhibit the more excellent catalytic ability.

Here, a film thickness of the catalytic film (for example, alumina) is measured in accordance with an AES depth profile measurement using an Auger electronic spectroscopic analyzer (Auger Microprobe JAMP-10MXII made by JEOL Ltd.), and is calculated based on an intersection P between an obtained relative mass curve of aluminum and an obtained relative mass curve of oxygen.

That is, the film thickness is a value obtained by multiplying a time from a point of time that the measurement starts to a point of time that the relative mass curve of aluminum and the relative mass curve of oxygen intersect with each other by a sputtering speed of the catalytic film.

The value "100 nm" of the film thickness of the alumina coating film is a value obtained as a result of extensive studies carried out by the inventors of the present invention.

To be in more detail, from a result of the AES depth profile measurement, it is understood that, at an initial stage before the relative mass curve of aluminum and the relative mass curve of oxygen reach the intersection P, It is understood that an alumina sintered layer in which the relative mass curve of aluminum and the relative mass curve of oxygen become straight lines is formed.

Here, "sintered" implies a state where the alumina coating film is densely structured by baking. For example, as can be understood from an Auger analysis result shown in FIG. 4A and FIG. 4B, even in a case where the alumina coating films having the same film thickness of 100 nm which is a value obtained based on the intersection P between the relative mass curve of aluminum and the relative mass curve of oxygen are used, when an analysis result of the sintered alumina coating film shown in FIG. 4A is compared with an analysis result of an alumina coating film which is not sintered shown in FIG. 4B, a concentration gradient toward the intersection P shown in FIG. 4A is steep. That is, the alumina coating film according to the present invention implies an alumina coating film in a sintered state where a crystal layer in which oxygen is contained at high concentration appears stably for several minutes under the measurement conditions described in the drawings. It is understood empirically that an alumina coating film having a sintered alumina layer of less than 30 nm cannot generate active oxygen species efficiently. Further, a layer where the relative mass curve of aluminum and the relative mass curve of oxygen intersect with each other is formed as a transition zone where a crystallized alumina layer and an aluminum layer which constitutes the base material are gently mixed with each other. The layer improves durability for preventing peeling-off of the alumina layer from the aluminum layer even when ultrasonic vibrations or strong water pressure is applied to the catalytic body.

Further, when the above-mentioned baking step is performed in multiple stages after removing the aluminum coating film which is non-uniformly formed on the surface of the aluminum fibers by applying alkali treatment to aluminum fibers, a thickness of the sintered layer is increased to 100 nm or more. Further, it is also possible to form alumina fibers in which a thickness of an alumina layer calculated based on an intersection P of the relative mass curve of aluminum and the relative mass curve of oxygen exceeds 300 nm.

Here, the steps which are performed to form the sintered layer are not limited to reactions relating to No. 1050 aluminum fibers. Even with the use of No. 1070 aluminum fibers or fibers which are made of other aluminum alloy, it is possible to form fibers having the substantially same technical features.

The catalytic body may be formed by forming an alumina coating film by heating the aluminum fibers, and by coating the alumina film with titania which constitutes a catalytic film.

Due to such steps, it is possible to impart catalytic ability derived from titania to the aluminum fibers having the alumina coating film. Further, a specific surface area of the alumina coating film which is formed into the dense structure by sintering is increased approximately ten times and hence, strong bonding between the alumina coating film and the titania layer is generated. Accordingly, compared with a catalytic body which is obtained by merely coating aluminum with titania or a catalytic body which is obtained by coating alumina which is baked but is not sintered with titania, an oxide film functions as an insulation body and hence, it is possible to produce the catalytic body which exhibits not only excellent durability but also extremely high catalytic ability.

Further, by selecting aluminum-based metal containing silica as aluminum being used for producing the aluminum fibers, the thin titania film formed on the fibers is firmly bonded to silica and hence, it is possible to form the catalytic body which exhibits excellent corrosion resistance, excellent heat resistance and excellent durability.

To explain the aluminum fibers in more detail, to produce the aluminum fibers which form an alumina thin film on a surface thereof as a carrier and to form a titania thin film as a catalyst coating film, for example, by applying dip coating using a sol-gel process which uses titanium isopropoxy acetyl acetonate or the like, it is possible to form a dense thin film made of titania on the alumina film thus uniformly forming the thin titania film.

The titania film forming method is not limited to dip coating by a sol-gel process. That is, it is also possible to form an excellent catalytic body by a method in which a fluororesin is used as a binder, dip coating is applied as a paint, and spin treatment is performed for forming a uniformly thin film.

By exciting the uniform thin titania film with ultraviolet rays, it is possible to cause a photocatalytic reaction more efficiently thus generating a larger quantity of active oxygen species.

The characteristics of the catalytic body in which the metal oxide thin film having a thickness of 30 nm or more is formed on the base material as a crystal body and/or a sintered body in the above-mentioned manner are not limited to the catalytic body in a form of fibers. The catalytic body in a form of powders or in a form of beams also exhibits the substantially same characteristics. By ensuring the metal oxide thin film to have the thickness of 30 nm or more, the catalytic body can be used for a long period. Accordingly, even when the thin film is peeled off due to damage thereon, the catalyst film is separated as relatively large metal pieces of sub micron order and hence, the influence of the catalyst film on an ecological system and environment can be eliminated. Further, the catalytic body can be manufactured at a low cost. Still further, metal which is used for forming the catalytic body is not limited to alumina or titania. That is, a catalyst active substance such as zinc oxide, magnesium oxide, magnesium hydroxide, aluminum hydroxide, tungsten oxide, barium titanate, strontium titanate, sodium titanate, zirconium dioxide, molybdenum oxide, hydroxide molybdenum compound, tungsten oxide, hydroxide tungsten compound, $\alpha$-$Fe_2O_3$, cadmium sulfide, zinc sulfide, platinum, copper, silver, palladium or the like can be also used.

Particularly, the catalytic body 25 used in this embodiment is formed of fiber bodies having free ends thereof vibrated by ultrasonic vibrations, and by applying ultrasonic vibrations to the catalytic body 25, the free ends of the fibers of the catalytic body 25 are vibrated so that it is possible to increase a flow speed of water which flows while being in contact with a surface of the catalytic body 25 whereby it is possible to disperse a large quantity of active oxygen species in water which flows on the surface of the catalytic body 25. Here, "free ends" is a term which implies respective end portions of fibers of a collective body formed of fibrous substances.

To be more specific, active oxygen species are generated from a vast surface area of the catalytic body 25 which is a mass of front surfaces of respective fibers and, at the same time, the generated active oxygen species are readily separated by shaking from the surface of the catalytic body 25 due to ultrasonic vibrations, and a large quantity of active oxygen species freely float in water.

Then, new active oxygen species are readily generated on the surface of the catalytic body 25 and, again, the active oxygen species are separated by shaking from the surface of the catalytic body 25 due to ultrasonic vibrations and freely float in water.

This action is repeatedly frequently and hence, it is possible to allow water to contain active oxygen species extremely efficiently.

Further, the catalytic body 25 formed of fibers having a diameter of 50 to 200 mm can generate vibrations more easily in conformity with minute ultrasonic vibrations compared to a plate-shaped catalytic body thus enabling the easier separation of the active oxygen species from the surface of the catalytic body.

Further, distal end portions of a large quantity of metal fibers constituting the catalytic body 25 behave as free ends under ultrasonic vibrations and hence, it is possible to efficiently separate active oxygen species into water from the catalytic body.

That is, to efficiently disperse active oxygen species generated by the catalytic body 25 into water, the catalytic body 25 is formed of fiber bodies having free ends, and a relative speed between the free ends of the catalytic body 25 and the water flow is remarkably increased by giving ultrasonic vibrations and hence, it is possible to produce water having redox activity.

Further, a function of active oxygen species can be imparted to water, and this water can be discharged or taken out from the reaction generation vessel 73 as water having redox activity.

In this manner, corresponding to a precursor substance of active oxygen species dissolved in water, it is possible to separate a large quantity of superoxide anion radicals or singlet oxygen. Accordingly, even after being taken out from the reaction generation vessel 73, water having redox activity can continuously maintain active oxygen species for a long period of time so that it is possible to allow an object which is brought into contact with water having redox activity to effectively generate an oxygen reduction reaction.

To further explain the present invention by returning to FIG. 2 and FIG. 3, the catalytic body 25 allows water to pass through between the first flow passage 50 and the second flow passage 51, and a flow passage for a third water flow which passes through the catalytic body 25 is referred to as a third flow passage 52.

Here, a starting end portion of the second flow passage 51, that is, a lower end portion of the helical plate 26 is arranged to face a water inlet 13 formed in a lower portion of an outer peripheral surface of the reaction part outer sleeve 12 as shown in FIG. 2 which is a cross-sectional view.

Due to such a shape, water supplied to the reaction generation vessel 73 through the water inlet 13 can easily flow into the second flow passage 51 from the first flow passage 50 so that the pressure difference attributed to the difference in flow speed is generated between the first flow passage 50 and the second flow passage 51.

Accordingly, it is possible to efficiently generate the third water flow in the third flow passage 52 formed in the catalytic body 25 and hence, it is possible to allow water (running water) to effectively contain active oxygen species generated by the catalytic body 25 therein.

Then, water having redox activity can be discharged and taken out through a water outlet 27 formed on an upper portion of an outer peripheral surface of the reaction part outer sleeve 12.

Next, the structure of the reaction generation vessel 73 in the vicinity of the lower portion of the reaction part outer sleeve 12 is explained. A bottom portion opening formed in the reaction part outer sleeve 12 is closed by a reaction part bottom plate 14. Exposure holes 28 which expose a part of the ultrasonic vibrators 11 in the inside of the reaction part outer sleeve 12 are formed in the reaction part bottom plate 14.

A plurality of (two in this embodiment) ultrasonic vibrators 11 are arranged on a lower portion of the reaction part bottom plate 14, and expose vibration plates 29 of the ultrasonic vibrators 11 toward the inside of the reaction part outer sleeve 12 from the above-mentioned exposure holes 28. Due to such a constitution, ultrasonic vibrations are imparted to water (running water) filled in the reaction part outer sleeve 12 or to the catalytic body 25.

Further, the vibration plates 29 arranged on the ultrasonic vibrators 11 are arranged obliquely at a predetermined angle with respect to the horizontal direction so that ultrasonic vibrations are efficiently imparted to the catalytic body 25.

Next, the control part 30 which is arranged below the reaction part 10 is explained.

The control part 30 and the reaction part 10 are joined to each other by way of supports 32.

The control part 30 has a box shape and incorporates an ultrasonic vibration generating device 31 therein. To be more specific, the control part 30 includes a control part lid plate 33 which closes an upper portion of the control part 30, and a control part bottom plate 34 which closes a lower portion of the control part 30. An air inlet 35 and an air outlet 36 are provided to both opposing side surfaces of the control part 30 for cooling the ultrasonic vibration generating device 31 stored in the control part 30.

The ultrasonic vibration generating device 31 is mounted on an upper surface of the control part bottom plate 34, and the ultrasonic vibration generating device 31 plays a role of generating an electric signal having predetermined frequency when electricity is supplied to the ultrasonic vibration generating device 31 from a power source not shown in the drawings, and a role of transmitting the electric signal to the ultrasonic vibrators 11 connected thereto thus generating the ultrasonic waves.

Legs 37 which are made of an elastic material are arranged on a lower surface side of the control part bottom plate 34 thus preventing the propagation of vibrations of the reaction generation vessel 73 generated along with the driving of the ultrasonic vibrators 11 to the surrounding.

A cooling fan 38 which is driven by a power source not shown in the drawing is provided to the water inlet 35, while a mesh plate 39 which allows the circulation of air is provided to the exhaust port 36. Due to such a constitution, the ultrasonic vibration generating device 31 is cooled by an air flow which is generated by the cooling fan 38, and air can be discharged through the mesh plate 39.

The reaction generation vessel 73 according to this embodiment having the above-mentioned constitution is driven as follows.

Firstly, when water (running water) is supplied to the water inlet 13, water is gradually filled in the inside of the reaction part 10 (inside of the reaction part outer sleeve 12), and the catalytic body 25 is immersed in water. Further, water flows out from the water outlet 27.

The first water flow which flows between the outer surface of the cell body 17 and the inner peripheral surface of the catalytic body 25 is generated in the first flow passage 50, and the second water flow which elevates along the helical plate 26 is generated in the second flow passage.

Here, with respect to the second flow passage, the second water flow is elevated while possessing a centrifugal force along an inner peripheral surface of the reaction part outer sleeve 12 and hence, to compare a water pressure in the vicinity of the inner peripheral surface of the reaction part outer sleeve 12 and a water pressure in the vicinity of an outer peripheral surface of the catalytic body 25 with each other, the water pressure in the vicinity of the outer peripheral surface of the catalytic body 25 becomes smaller.

Further, the first water flow which directly flows into the water inlet 13 is also water which flows through a bypass which connects the water inlet 13 and the water outlet 27 with a short distance and hence, the first water flow exhibits a low pressure loss attributed to resistance and possesses a relatively high pressure.

Accordingly, in the vicinity of the inner and outer peripheral surfaces of the catalytic body 25, due to the difference in water pressure between the first flow passage 50 and the second flow passage 51, the third water flow which reaches the second flow passage from the first flow passage 50 after passing through the inside of the catalytic body 25 (passing through the third flow passage) is generated.

In such a state, when electricity is supplied to the ultrasonic vibration generating device 31, ultrasonic waves are generated by the ultrasonic vibrators 11, and ultrasonic waves are applied to water (running water) in the inside of the reaction part 10 and the catalytic body 25.

Active oxygen species are generated on the surface of the catalytic body 25 to which the ultrasonic waves are applied, and active oxygen species freely float in water in the vicinity of the catalytic body 25.

Further, also with respect to active oxygen species which are generated in the inside of the catalytic body 25, active oxygen species are mixed into the second water flow through the third water flow thus producing water having redox activity. Then, water having redox activity is discharged from the water outlet 27 and is supplied to the above-mentioned active oxygen concentration control part 74.

In addition to the above-mentioned constitution, when electricity is supplied to an electricity supply part of the electromagnetic wave generation device 21, electromagnetic waves are generated from tube parts 23, and electromagnetic waves are radiated to the catalytic body 25 through the cell body 17.

Due to such a constitution, active oxygen species generated on the surface of the catalytic body 25 are further increased thus producing water having redox activity which contains a larger quantity of active oxygen species.

[Specific Constitution of Reaction Generation Vessel of Water Producing Apparatus According to Another Embodiment]

Figure 5:
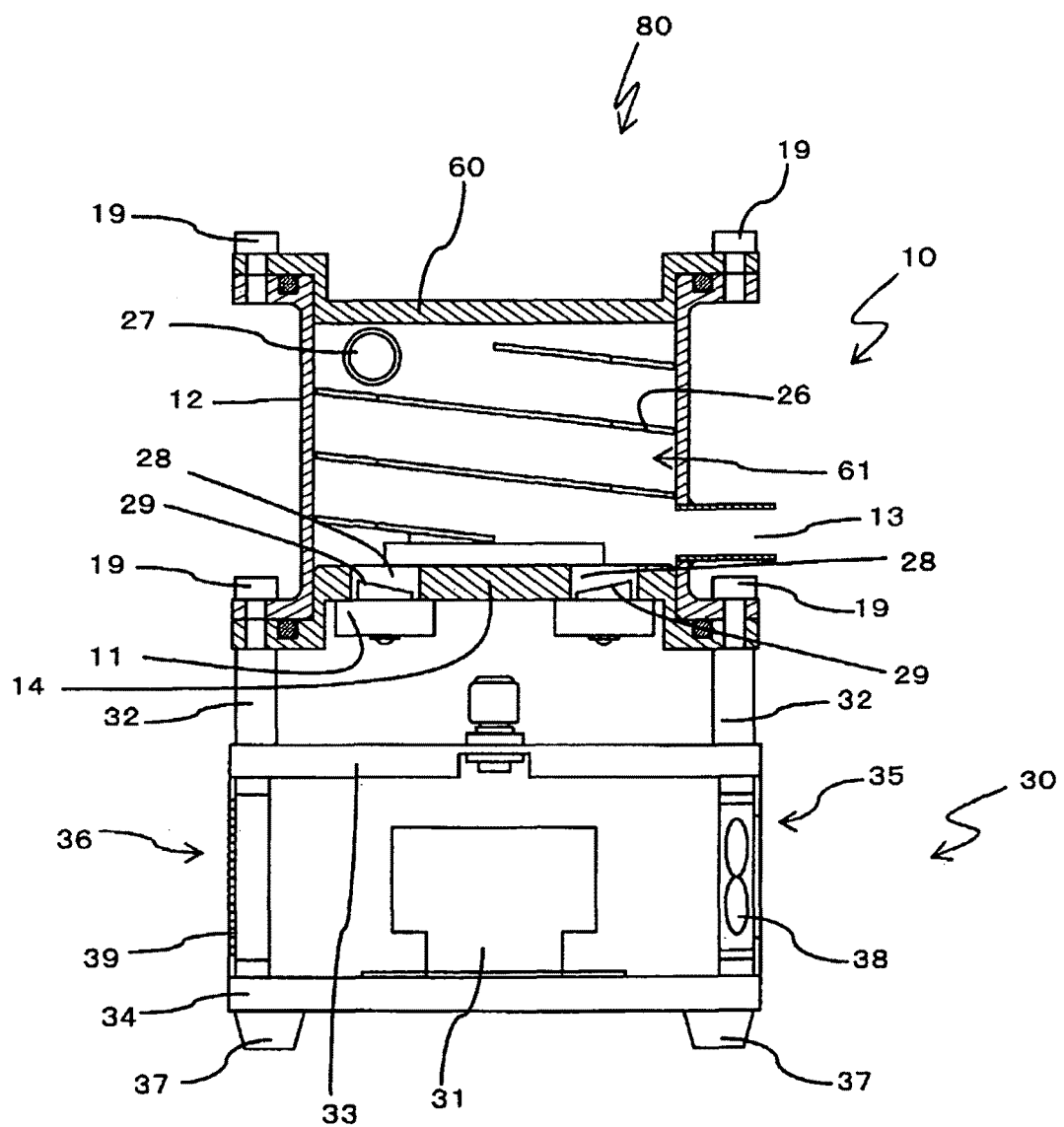
Figure 6:
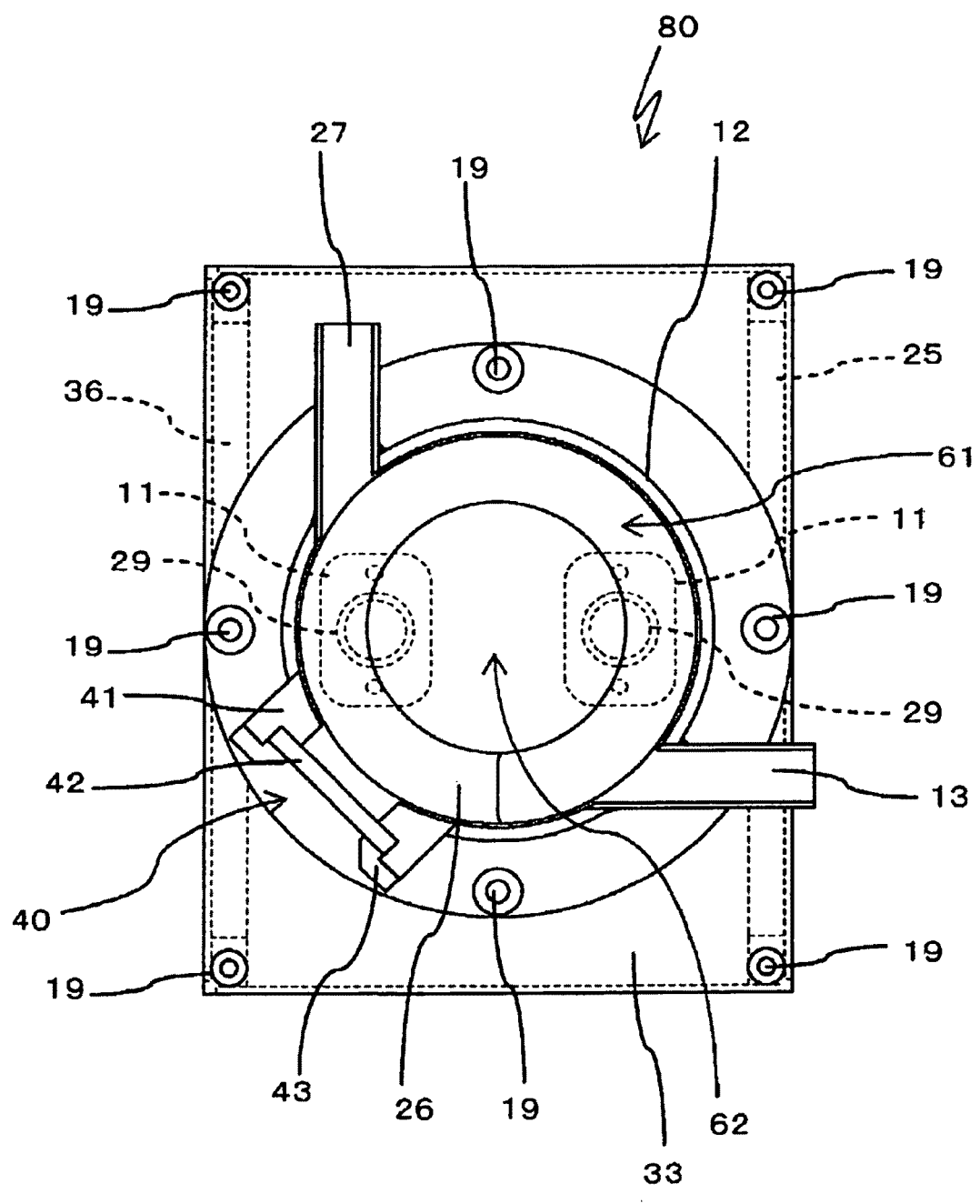

Next, the reaction generation vessel 80 used in a water producing apparatus B according to another embodiment is explained in conjunction with FIG. 5 and FIG. 6. The water producing apparatus B includes, in place of the reaction generation vessel 73 provided to the above-mentioned water producing apparatus A, a reaction generation vessel 80 having the simple constitution.

Although the reaction generation vessel 80 has the same basic structure as the above-mentioned reaction generation vessel 73, the reaction generation vessel 80 differs from the reaction generation vessel 73 with respect to a point that the reaction generation vessel 80 is not provided with the electromagnetic wave generation device 21 and the catalytic body 25.

For example, when it is necessary to form a mirror surface on a surface of an alumina working body in a metal working site by polishing, a large quantity of water is used. In this case, alga propagates in water so that odors are generated or bacteria are adhered to products thus giving rise to a drawback when semiconductors are shipped to a semiconductor manufacturing site.

Here, almina powder generated by polishing floats in water so that reaction activity of water is increased. Also by this reaction generation vessel 80, water (running water) can contain active oxygen.

In the explanation made hereinafter, the explanation may be omitted with respect to parts of the reaction generation vessel 80 having the same constitution as the corresponding parts of the above-mentioned reaction generation vessel 73. Further, in FIG. 5 and FIG. 6, the parts of the reaction generation vessel 80 having the same constitution as the corresponding parts of the above-mentioned reaction generation vessel 73 are indicated by same symbols.

FIG. 5 is a cross-sectional side view of the reaction generation vessel 80 according to this embodiment, and FIG. 6 is a cross-sectional plan view.

The reaction generation vessel 80 according to this embodiment is a device which produces water containing active oxygen species by supplying water (running water) to the reaction generation vessel 80. The reaction generation vessel 80 is constituted of a reaction part 10 which includes a water flow passage, and a control part which controls driving of ultrasonic vibrator 11 arranged in the reaction part 10.

The reaction part 10 includes an approximately cylindrical reaction-part outer sleeve 12 provided with a water inlet 13 which constitutes a port for receiving water (running water) and a water outlet 27 which constitutes a takeout port (flowout port) for water containing active oxygen species. A bottom opening formed in the reaction-part outer sleeve 12 is closed by a reaction-part bottom plate 14, and an upper opening is closed by a reaction-part lid plate 60. Further, a naked-eye observation window 40 is formed in an outer peripheral surface of the reaction-part outer sleeve 12 also shown in FIG. 6.

Firstly, to explain parts in the vicinity of an upper portion of the reaction-part outer sleeve 12, the reaction-part lid plate 60 is fixed to the reaction-part outer sleeve 12 by bolts 19 so as to close the upper opening of the reaction-part outer sleeve 12. Further, a packing 18 is interposed between the reaction-part outer sleeve 12 and the reaction-part lid plate 60 so as to maintain water tightness between the reaction-part outer sleeve 12 and the reaction-part lid plate 60.

Next, the inner structure of the reaction-part outer sleeve 12 is explained. In the inside of the reaction-part outer sleeve 12, a helical plate 26 which is formed spirally along an inner wall surface of the reaction-part outer sleeve 12 is arranged. That is, the helical plate 26 of plural turns (three turns in this embodiment) is formed on an inner peripheral surface of the reaction-part outer sleeve 12. Between blades which overlap with each other in the vertical direction, a helical flow passage 61 in which water flows in a spirally elevating manner along the helical plate 26 is formed.

Further, an open through space 62 is formed at the center portion of the helical plate 26 in which the cell body 17 is inserted in the previously-mentioned reaction generation vessel 73 thus enabling the circulation of water (running water).

Here, a starting end portion of the helical flow passage 61, that is, a lower end of the helical plate 26 is, as shown in FIG. 5 which is a cross-sectional view, arranged to face the water inlet 13 formed in a lower portion of an outer peripheral surface of the reaction part outer sleeve 12. Due to such a shape, water supplied to the reaction generation vessel 80 through the water inlet 13 flows into the helical flow passage 61 more easily than the open through space 62. Accordingly, when water (running water) is supplied to the reaction generation vessel 80 through the water inlet 13, an eddy current is formed in the open ceiling space 62. Further, since the reaction-part outer sleeve 12 is closed by the reaction-part lid plate 60, there is no possibility that air is not entrained in the eddy current so that an elevating water flow is formed at a center portion of the eddy current. Then, due to the combination flow of the water flow which flows in the above-mentioned helical flow passage 61 and the elevating water flow, it is possible to introduce the water flow to the water outlet while uniformly agitating water without causing stagnation of water flow which flows in the inside of the reaction part.

In such a state, when electricity is supplied to the ultrasonic vibration generating device 31, ultrasonic waves are generated by the ultrasonic vibrators 11 and the ultrasonic waves are imparted to water (running water) in the inside of the reaction part 10. Active oxygen species are generated in water to which the ultrasonic waves are imparted and the active oxygen species float freely in water.

[Examining Experiment]

Next, a content of active oxygen contained in water containing active oxygen species generated by the water producing apparatus A is measured.

In confirming the development of various kinds of active oxygen species, the following circulating system is built as an experiment system for confirming the development of active oxygen species. That is, in the circulating system, circulating water is introduced into a precursor adding device which uses a membrane oxygenator (Platinum Cube NCVC6000 made by Edwards Lifesciences LLC. or Synthesis M made by Sorin Biomedica Japan K.K.) using a small centrifugal pump (Bio Pump made by Medtronic Japan, Inc.) thus forcibly elevating the concentration of dissolved precursor. Then, the circulated water is supplied to the water producing apparatus A from the water reservoir thus producing water containing developed active oxygen. Thereafter, the water is returned to the water reservoir.

It is possible to control a flow rate, a water temperature and the dissolved precursor concentration of water circulated in this system to fixed values within a range of from 500 ml/minutes to 20 L/minute, within a range from 0° C. to 43° C., and within a range from 1 to 45 mg/L respectively.

Further, it is possible to eliminate influence of bubbling which is generated when oxygen is directly administered to the inside of the circuit to increase oxygen concentration. The precursor adding device is not limited to a membrane oxygenator and, provided that the dissolved gas concentration can be controlled, any means can be used as the precursor adding device without causing a problem. In an actual use, the concentration of the dissolved gas may be controlled in the following manner. That is, the gas may be mixed into the circuit by direct bubbling, and further, a size of the mixed gas bubbles may be reduced by a stirring device so as to allow the gas to be mixed as minute bubbles or, the gas may be dissolved in water as a gas in a smaller molecular state by applying ultrasonic vibrations to the small bubbles.

Further, here, oxygen concentration is exemplified as a concentration of the gas to be controlled, that is, the adjustment of dissolved oxygen concentration is exemplified as a concentration of the gas to be controlled. However, depending on a kind of the targeted active oxygen species, it is possible to control the concentration of the dissolved gas by mixing ozone or oxygen containing a large quantity of ozone (it is possible to generate highly-concentrated oxygen containing 300 ppm of ozone by giving pure oxygen to a ceramic ozonizer), a nitrogen monoxide gas, a chlorine gas or the like.

The reduction of the quantity of the circulating water caused by incorporating an atomization ultrasonic vibrator in the apparatus is hardly recognized.

The following confirmation is performed under the following conditions. 2 L of distilled water is circulated at a circulation flow rate of 5 L/min, oxygen is added as a precursor, and the concentration of the dissolved oxygen is set to 12 mg/L. Two sets of atomization-use 2.4 MHz ultrasonic vibrators (HM-2412, atomization capacity 250±50 ml/h (water, 25° C.)) or two sets of atomization-use 1.6 MHz ultrasonic vibrators (HM-1630, atomization capacity 575±125 ml/h (water, 25° C.)) are used as the ultrasonic vibrators 11 arranged on the water producing apparatus A (reaction generation vessel 73), and a black light (EFD15BLB made by Toshiba Lighting & Technology Corporation, peak wavelength: 352 nm, ultraviolet ray output: 1.8 W) is used as the electromagnetic wave generation device 21.

The following comparative circulation experiments are performed by exchanging the catalytic body 25 arranged in the water producing apparatus A (reaction generation vessel 73) with respect to catalytic bodies divided into three groups of
A) catalytic bodies with no fibers
B) catalytic bodies containing 10 g of aluminum fibers with alumina sintered film having film thickness of 30 nm
C) catalytic bodies containing 10 g of titania fibers with alumina sintered film having film thickness of 30 nm and with titania film having film thickness of 600 nm formed by dip coating and baking.

[Examining Experiment 1: Confirmation of Generation of Hydroxy Radicals]

First, the confirmation of the generation of hydroxy radicals in the device is performed. With respect to the measurement of the hydroxy radicals in water, ESR spectrum is measured using an electron spin resonance device (made by JEOL Ltd., product name "JEOL (JEOL-TE 200) ESR. Spectrometer (X-band)") in the following manner under the condition described as follows. That is, DMPO is provided in distilled water with the concentration of 500 mmol/L, and after the water is circulated until the oxygen concentration becomes the dissolved oxygen concentration of 12 mg/L, the application of ultrasonic vibrations to water and the radiation of electromagnetic waves to water are simultaneously started, and the solution in the reservoir is sucked by a spin-trapping-use quartz flat cell at timings of 1 minute, 5 minutes, 10 minutes, 15 minutes, 20 minutes, 30 minutes after the reaction is started.

Figure 7:
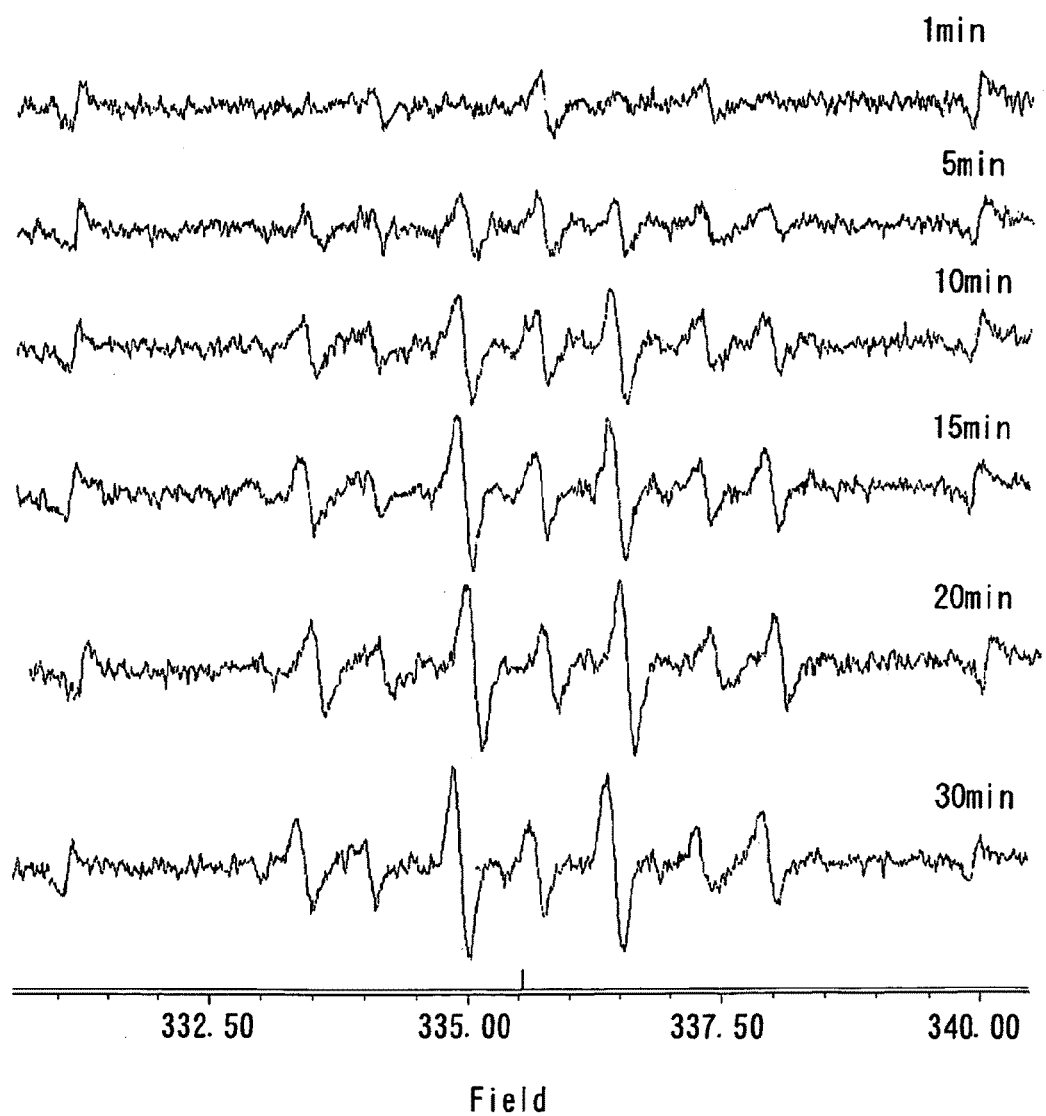

Measuring condition; ESR spectrum measuring condition output: 8 mW, center of magnetic field: 336 mT, range of fluctuation: ±7.5 mT A result of examination using titania fibers of group C) is shown in FIG. 7. This spectrum indicates the typical signal intensity shape of 1:2:2:1. From a pattern and an ultrafine coupling constant, it is confirmed that this spin adduct is generated by hydroxy radicals (.OH). Here, a weak waveform indicated by a base line suggests the presence of other active oxygen species, and increase of reaction waveform relative to spike of $MnO_2$ used for the control is confirmed along with a lapse of time.

Although the titania fibers of group C) shows the steepest rise in the reaction curve, generation of hydroxy radicals is also confirmed in group B) using the alumina fibers.

[Verification Experiment 2: Confirmation of Generation of Superoxide Anion Radicals]

Next, the confirmation of generation of superoxide anion radicals in the water producing apparatus B of water having redox activity provided with a reaction generation vessel 80 (hereinafter referred to as water producing apparatus B) in place of the above-mentioned water producing apparatus A and the reaction generation vessel 73 of the water producing apparatus A is performed.

[Verification Experiment 2a: Confirmation of Generation of Superoxide Anion Radicals by the Water Producing Apparatus A]

The following confirmation of generation of superoxide anion radicals is performed under the following condition. 10 L of water is circulated at a circulation flow rate of 15 L/min, oxygen is added as a precursor, the dissolved oxygen concentration is set to 30 mg/L, and a circulation water temperature is set to 20° C. Two sets of atomization-use 2.4 MHz ultrasonic vibrators (HM-2412, atomization capacity 250±50 ml/h (water, 25° C.)) or two sets of atomization-use 1.6 MHz ultrasonic vibrators (HM-1630, atomization capacity 575±125 ml/h (water, 25° C.)) are used as the ultrasonic vibrators 11 arranged on the water producing apparatus A (reaction generation vessel 73), and a black light (EFD15BLB made by Toshiba Lighting & Technology Corporation, peak wavelength: 352 nm, ultraviolet ray output: 1.8 W) is used as the electromagnetic wave generation device 21.

The measurement of the superoxide anion radicals in water is performed in the following manner. That is, using Cypridina luciferin analog derived from sea fireflies (hereinafter abbreviated as CLA) which is a chemiluminescent reagent which is specific to superoxide and exhibits reactivity to singlet oxygen to some extent, the chemiluminescence dependent on CLA is detected by a luminometer and is recorded.

Further, timings for collecting samples are set to immediately before the starting of reaction, 15 minutes after the start of reaction, and 30 minutes after the starting of reaction. At respective timings, 500 ml of aqueous solution in the reservoir is sampled using a micropipette and is added to 500 ml of 25 mM phosphoric acid potassium buffer solution (pH7.0) to which CLA is preliminarily added (1:1 mixture, total: 1 ml) and CLA chemiluminescence is measured. The intensity of luminescence is indicated by relative luminescence unit (hereinafter referred to as rlu).

Figure 8:
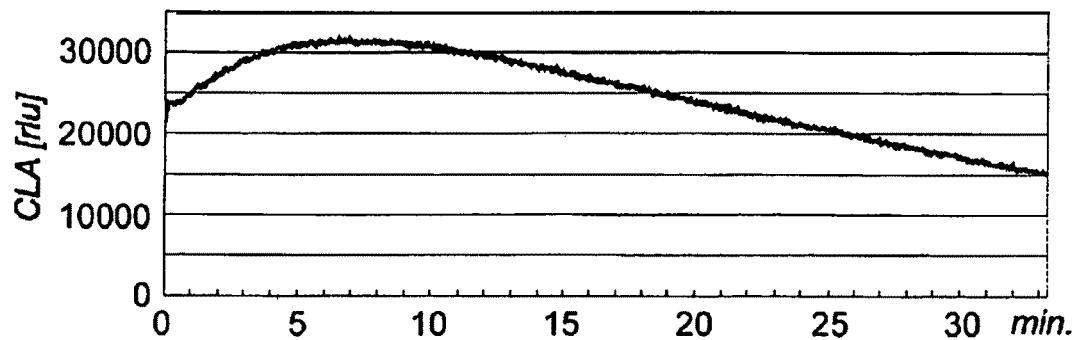

FIG. 8 shows a result of change with time of concentration of superoxide anion radicals obtained by CLA chemiluminescence at a point of time that 30 minutes elapses after reaction is started, at a point of time that 30 minutes elapses after CLA measurement is started. As shown in FIG. 8, in spite of a fact that the water containing active oxygen is taken out from the reservoir, that is, the water containing active oxygen is separated from the reaction field with the catalyst and is left in the luminometer, CLA chemiluminescence which is maintained for a long period of time is confirmed from the water containing active oxygen. Although CLA chemiluminescence having a spike shape should be originally confirmed, as shown in FIG. 8, a luminescence quantity is gradually increased for 10 minutes after the measurement is started and, then, the luminescence quantity is gradually decreased.

Generally, since superoxide anion radicals are extremely reactive and unstable, superoxide anion radicals instantaneously disappears in water. However, from this result, it is examined that the generation of superoxide anion radicals is continuously performed for a long period of time even outside the apparatus in water which is made to pass through the reaction generation vessel 73, that is, in water having redox activity. Further, the time is extremely long, and the reaction, that is, the redox activity continues even the time exceeds 30 minutes after the detection is started.

Figure 9:
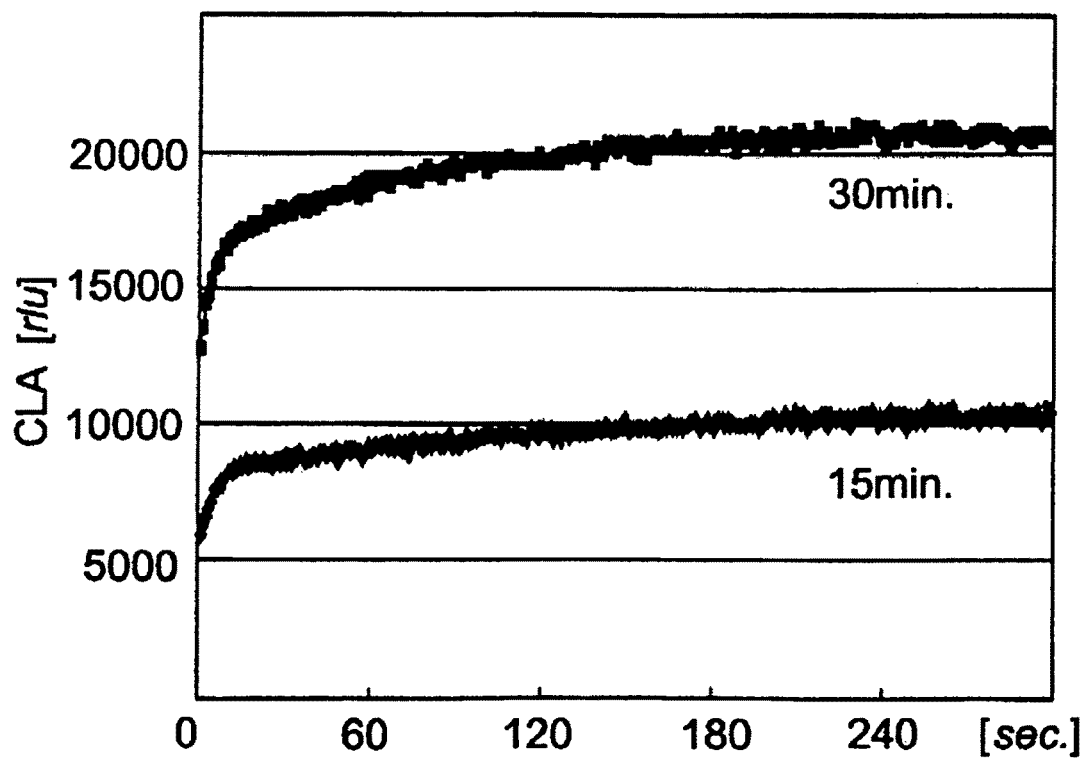

Further, as shown in FIG. 9, the longer the time during which water is circulated by the water producing apparatus A, larger the quantity of the superoxide anion radicals becomes and, the generation quantity is increased with the lapse of time even after sampling the water.

Generally, it is known that, although CLA is used as a specific detection reagent of superoxide anion radicals, CLA shows reactivity to singlet oxygen to some extent.

To examine whether or not the observed chemiluminescence reflects the generation of superoxide anion radicals, Tiron which is a remover of superoxide and DABCO which is a remover of singlet oxygen are added. Due to such an examination, it is confirmed that the CLA chemiluminescence which is observed this time reflects the generation of superoxide anion radicals in a single form.

In the same manner, the detection of hydrogen peroxide is also performed using luminol as chemiluminescence substrate, using horseradish peroxidase as a detection catalyst under the neutral pH condition. As a result, luminol luminescence is detected, and it is clarified that hydrogen peroxide of extremely low concentration of 1 to 20 nmol/L exists in water which has passed through the active oxygen containing water producing apparatus A. However, the generation quantity of hydrogen peroxide changes for every measurement time and hence, it is suggested that hydrogen peroxide involves in a reaction process of active oxygen water species. However, since the hydrogen peroxide contained in water exhibits the extremely low concentration, the hydrogen peroxide cannot generate the redox reaction attributed to extracellular stimulation.

Further, since it is considered that ozone involves in the reaction, ozone in air in the vicinity of reservoir is detected by a gas detecting tube. However, no ozone is detected. The presence and non-presence of ozone are confirmed using a calorimetric method by indigo carmine in circulating water. However, ozone is detected at all and hence, it is confirmed that generation of ozone is extremely low.

Further, $KO_2$ solution obtained by dissolving $KO_2$ (potassium superoxide) in an organic solvent is added to CLA solution thus preparing a calibration curve of superoxide anion by chemiluminescence dependent on CLA. Generally, a method which dissolves $KO_2$ in crown-ether-based organic solution and uses the solution for the determination of superoxide is used. However, to allow the reaction with CLA in aqueous solution in a non-hydrophobic environment, dimethylsulfoxide is used as organic solvent. Using this method, CLA chemiluminescence (DMSO) by adding $KO_2$ solution is induced whereby the calibration curve of superoxide anion radicals is prepared. As a result, water containing active oxygen generated by the water producing apparatus A can be produced as water containing a large quantity of superoxide anion radicals and can be maintained and operated for a long period of time and contains 200 mm mol/L of superoxide radicals at maximum.

[Verification Experiment 2b: Confirmation of Generation of Superoxide Anion Radicals in Water Producing Apparatus B]

Next, the measurement of content of active oxygen contained in water containing active oxygen species produced by the water producing apparatus B is performed. Here, the measurement method is substantially equal to the measurement of active oxygen contained in water containing active oxygen generated by the above-mentioned water producing apparatus A.

As a result of the measurement, it is found that in water containing active oxygen produced by the water producing apparatus B, by increasing the concentration of dissolved oxygen to be elevated to 10 mg/L by adjustment, even using only ultrasonic vibrations and without using both of microwaves radiation and catalytic body together with the ultrasonic vibrations, 50 nmol/L of superoxide anion radicals can be produced.

[Verification Experiment 3: Evaluation of Redox Activity]

Next, in a circulating system similar to the above-mentioned system for confirming the generation of superoxide anion radicals, the involvement mechanism of superoxide anion radicals in the open/close mechanism in a calcium channel in response to oxidation stress using tobacco cells is studied.

It is possible to verify whether active oxygen is generated or not by experiments which use an analytical chemical method or a physicochemical method. However, to assume a case where an object to which the water producing apparatus A is applied is living organisms, to verify whether or not active oxygen species of level are generated to an extent that at active oxygen species can exert influence on living organisms, there is no other method but a method which actually examines an effect on living organisms. Accordingly, the examination on whether or not active oxygen response reaction is induced is performed using a response reaction specific to active oxygen in a plant cell model as an index.

In a living organism, $Ca^{2+}$ is a signal-transmitting substance which becomes a key in an information transmission path which controls metabolism and gene expression. Usually, a concentration of cytoplasm free calcium ion (hereinafter abbreviated as $[Ca^{2+}]_{cyt}$) in live cell is maintained at low concentration and with a difference of $10^6$ to $10^7$ times compared to extracellular cytoplasm free calcium ion. On a cell membranes of living organisms including plants, calcium channels which constitute calcium inflow paths which are activated and open in response to a specific stimulus exist. The presence of most of calcium channels is elucidated at a gene level or at a protein level. The studies made by the inventors of the present invention and others have revealed that, in a plant cell, a voltage dependent calcium channel referred to as TPCI constitutes a calcium channel of active oxygen responsiveness. (Lin, C., Yu, Y., Kadono, T., Iwata, M., Umemura, K., Furuichi, T., Kuse, M., Isobe, M., Yamamoto, Y., Mastumoto, H., Yoshizuka, K. and Kawano, T. (2005) Action of aluminum, novel TPC1-type channel inhibitor, against salicylate-induced and cold shock-induced calcium influx in tobacco BY-2 cells. *Biochemical and Biophysical Research Communications* 332 (3): 823-830.) It is found that, in a tobacco culture cell (BY-2 cell) which is a model plant cell, active oxygen species such as hydrogen peroxide, superoxide, ozone (in practice, action of hydroxy radicals) are generated on the periphery of the cell, that the inflow of $Ca^{2+}$ to the inside of the cell from the outside of the cell is induced by adding these active oxygen species to the cell, and that the calcium channel which involves in the introduction of $Ca^{2+}$ to the inside of the cell is a TPC1 channel. As a method of nondestructively measuring the behavior of $Ca^{2+}$ in the cell, particularly, a change of $[Ca^{2+}]_{cyt}$, a method of monitoring the change of $[Ca^{2+}]_{cyt}$ in response to various stimulations using cells to which gene of aequorin which is $Ca^{2+}$ responsive photoprotein derived from Aequorea Victoria is established.

Due to this method, it is possible to monitor the change of $[Ca^{2+}]_{cyt}$ real time by observing bioluminescence. Accordingly, it is possible to determine whether or not water is turned into water having redox reaction in which the redox action is actually generated and the intracellular response is brought about.

"Cell death" of a plant cell induced by ozone treatment or active oxygen treatment is an event which takes place downstream of the calcium information transmission path and hence, by adding aluminum ions which are an inhibitor of the TPC1 channel, it is possible to prevent the active oxygen inductive cell death. By evaluating effect of addition of aluminum as an ion channel blocker and effects of an active oxygen removing agent, it is possible to determine whether or not a specific active oxygen responsive calcium channel is stimulated (Kawano, T., Kadono, T., Fumoto, K., Lapeyrie, F., Kuse, M. Isobe, M. Furuichi, T. and Muto, S. (2004) Aluminum as a specific inhibitor of plant TPC1 $Ca^{2+}$ channels. *Biochemical and Biophysical Research Communications* 324 (1): 40-45). Accordingly, by using the experimental system, it is possible to evaluate whether or not active oxygen species are present at a level where active oxygen species can stimulate calcium information transmission which is a key of various physiological action including the cell death or the gene expression in the plant cell.

Reaction water formed under various conditions using the substantially same method as the above-mentioned verification experiment 2 is sampled from a reservoir using a 100 ml micropipette, 1 mmol/L of coelenterazine is administered to 50 ml of tobacco BY-2 culture cell suspension to which aequorin gene of the $7^{th}$ day of the culture is preliminarily administered and preculture is performed, and the association between apoaequorin which is specifically expressed in cytoplasm due to the gene introduction and coelenterazine is prompted thus forming aequorin protein (holoprotein) having calcium responsive fluorescent ability. 100 ml of water having redox activity is added to 500 ml of suspension of cells in which aequorin is expressed (1:5 mixture, 600 ml in total), and CLA chemiluminescence and aequorin luminescence are measured. The luminescence intensity is marked as relative luminescence intensity (rlu). 10 L of tap water is used as circulating water and is circulated at a circulation flow rate of 15 L/min and at a circulation water temperature of 20° C. In adding oxygen to the circulating water as a precursor substance, the concentration of oxygen is elevated such that the dissolved oxygen concentration becomes 30 mg/L. Sampling is performed at a point of time that the circulation time of 30 minutes elapses so that the circulating water substantially arrives at equilibrium. The following confirmation is performed such that the ultrasonic vibrators 11 which are mounted on the water producing apparatus A (reaction generation vessel 73) incorporates therein two atomization 2.4 MHz ultrasonic vibrators (HM-2412, atomization capacity 250±50 ml/h (water, 25° C.)) or two atomization 1.6 MHz ultrasonic vibrators (HM-1630, atomization capacity 575±125 ml/h (water, 25° C.)). These reaction vessels are arranged in series, and a blacklight (EFD15BLB made by Toshiba Lighting & Technology Corporation, peak wavelength: 352 nm, ultraviolet ray output: 1.8 W) is used as an electromagnetic wave generation device 21.

Figure 10:
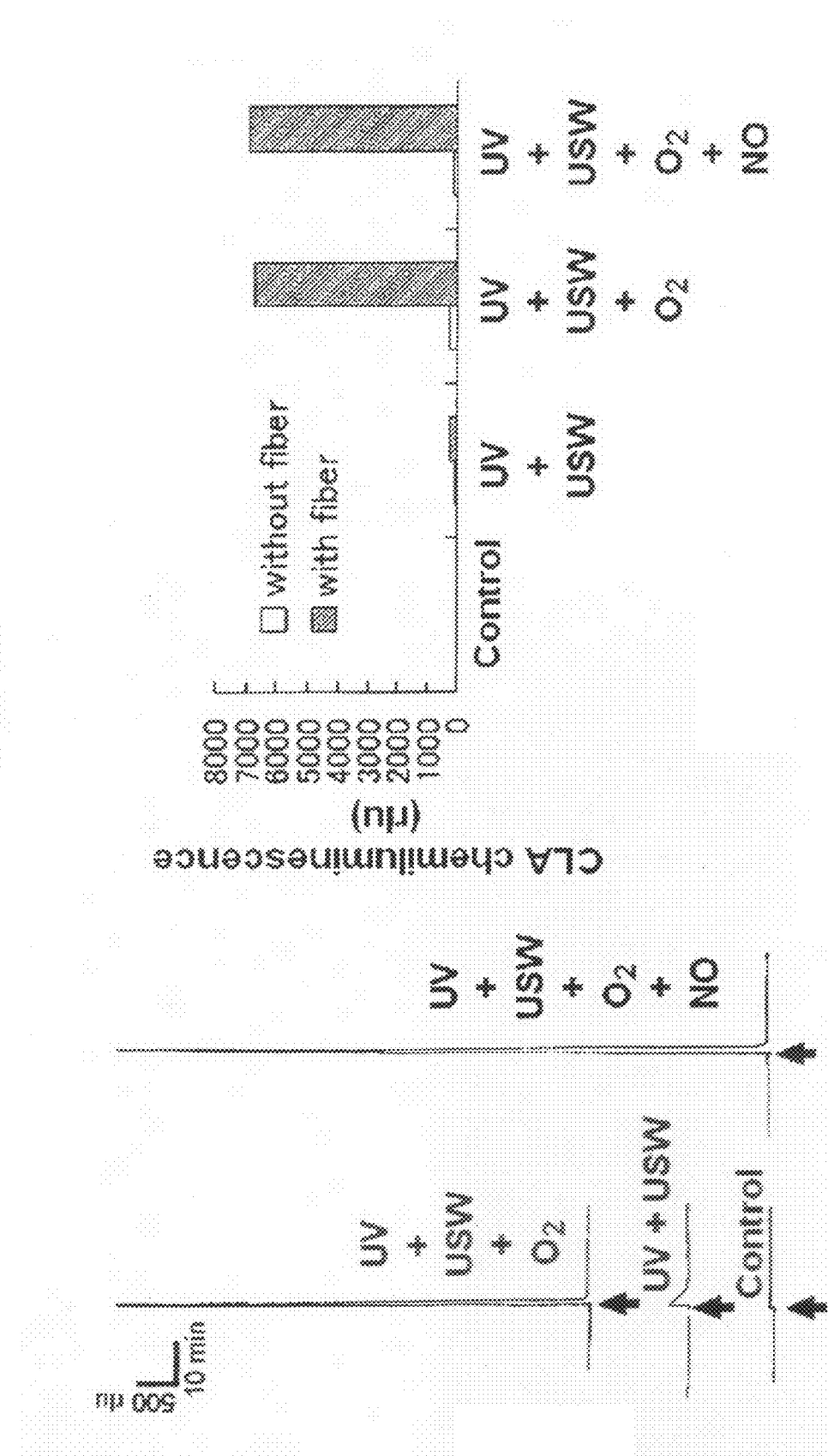

FIG. 10 shows CLA chemiluminescence when 100 ml of reaction water which is sampled from the reservoir 76 of the water producing apparatus A is mixed to a cell floating liquid. Compared to CLA chemiluminescence without cells, the time duration of CLA chemiluminescence is extremely short and this implies that superoxide anion radicals instantaneously acts on the surfaces of the cells and disappears. With respect to the CLA chemiluminescence, the extremely high CLA chemiluminescence is obtained in water containing a large quantity of peroxy nitrate described later which is produced by adding NO gas using a sample and conditions related to the sample obtained by radiating ultraviolet rays on the catalytic body, applying ultrasonic vibrations and elevating the concentration of dissolved oxygen to 30 mg/L and in which superoxide anion radicals arrives at 0.2 mM at maximum according to CLA chemiluminescence shown in the verification experiment 2.

Figure 11:
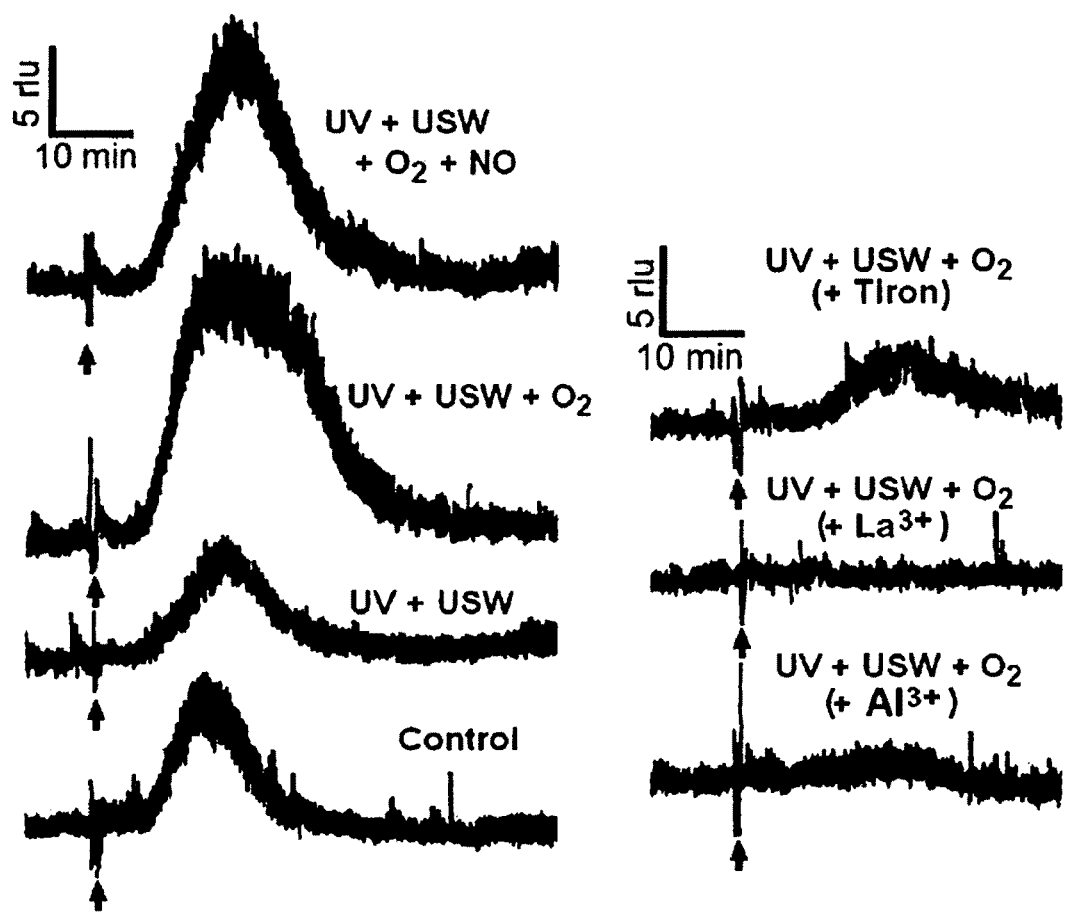

FIG. 11 shows aequorin luminescence obtained under respective conditions. The increase of aequorin luminescence at low level observed in a control experiment area (addition of tap water) is induced by the elevation of $[Ca^{2+}]_{cyt}$ due to the stimulation of chance responsive calcium channel by hypoosmolality stimulation and is caused by a mechanism different from the mechanism for increasing $[Ca^{2+}]_{cyt}$ by way of an active oxygen responsive calcium channel and hence, it is possible to differentiate the respective increases of aequorin luminescence. (Lin, C. and others, *Biochemical and Biophysical Research Communications* 332 (3): 823-830.) Compared to a control experiment in which tap water is added to the cell floating liquid, in the same manner as the previously-mentioned CLA chemiluminescence, a sample in which the concentration of superoxide anion radicals arrives at the concentration of 0.2 mM at maximum and a sample containing a large quantity of peroxy nitrate exhibit the extremely high aequorin luminescence. Further, the reactions can be suppressed with respect to all of Tiron which is a selective superoxide remover, $La^{3+}$ which is a superoxide scavenger and $Al^{3+}$ which is a calcium channel inhibitor having an active oxygen reaction. This implies that, by adding water containing active oxygen species to the cell floating liquid, opening of the calcium channel having redox reaction which a plant cell possesses is induced, and hence, the aequorin luminescence can become an index that the water has redox activity.

Figure 12:
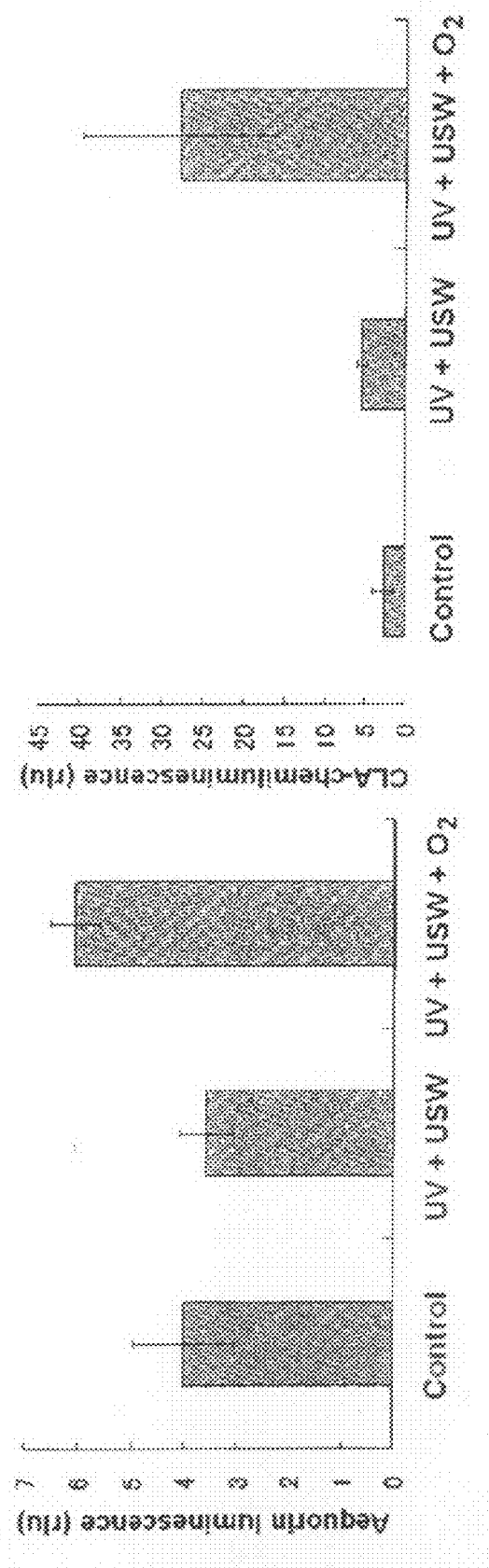

FIG. 12 shows graphs in which aequorin luminescence and CLA chemiluminescence of a sample in which the concentration of dissolved oxygen is set to 8 mg/L and aequorin luminescence and CLA chemiluminescence of a sample in which the concentration of dissolved oxygen is set to 30 mg/L are compared among samples to which ultrasonic vibrations are applied in addition to the radiation of ultraviolet rays to the catalytic body. Based on the result, it is determined that, the water having redox activity in which the redox reaction is actually generated and the intracellular response can be generated can be water having redox activity only under conditions where the water contains superoxide anion radicals at the concentration of at least 5 mM and redox activity is maintained for a long period.

[Verification Experiment 4: Confirmation of Presence of Ion Path Along with Disappearance of Hypochlorous Acid or Hydrogen Peroxide]

AFP (2-[6-(4'-amino)phenoxy-3H-xanthen-3-on-9-yl] benzoic acid) is originally one of reagents developed as a probe which can detect active oxygen species under a physiological condition based on a change of fluorescence intensity. It has been reported that AFP is highly selective to a hypochlorous acid thus enabling the highly sensitive detection of hypochlorous acid. Further, there is no possibility that fluorescence increases independent of active oxygen species due to the radiation of excitation light and hence, AFP is considered to be a highly reliable fluorescent probe. Because of the high sensitivity which this reagent possesses, it is possible to detect active oxygen species base on fluorescence with 0.4 ppm or less of hypochlorous acid contained in tap water (tap water reference concentration). AFP dependent fluorescence is not detected in distilled water, while AFP dependent fluorescence is largely increased only in tap water and the fluorescence is stably maintained. When the disappearance of the AFP fluorescence due to a reaction between water obtained by adding the AFP to circulating water and a catalyst is observed, the AFP fluorescence disappears with the application of only UV-A radiation and ultrasonic vibrations without adding oxygen. In the same manner, hydrogen peroxide water is mixed to circulating water and the concentration of the hydrogen peroxide water is measured using a luminol reaction. When oxygen having the dissolved oxygen of 20 mg/L concentration hydrogen is added in addition to UV-A radiation and ultrasonic vibrations, peroxide having the initial concentration of 1 ppm quickly disappears.

According to these results, the following is understood. During the process for producing water containing the active oxygen species, various intermediate bodies of active oxygen species (ROI) involve in enabling the water to maintain the activity of active oxygen for a long period of time. It is found that, as a result of discharging a large quantity of free electrons and holes which are excited on the surface of the catalytic body in water by applying microwaves and ultrasonic vibrations to the catalytic body, the properties of water are changed into a state where the exchange of free electrons and holes takes place between free radicals such as ozonide-like radicals, hydrogen peroxide, super oxide anion radicals, peroxy nitrate, lipid peroxide (LOOH, LOO.), halogenation oxygen (ClO$^-$), nitrogen monoxide radicals (NO.), organic radical species containing oxygen and singlet oxygen ($^1O_2$), cyclic peroxide formed of singlet oxygen, hydroperoxide or the like freely although in an unstable manner.

[Verification Experiment 5: Examination of Generation of Peroxy Nitrate]

Figure 13:
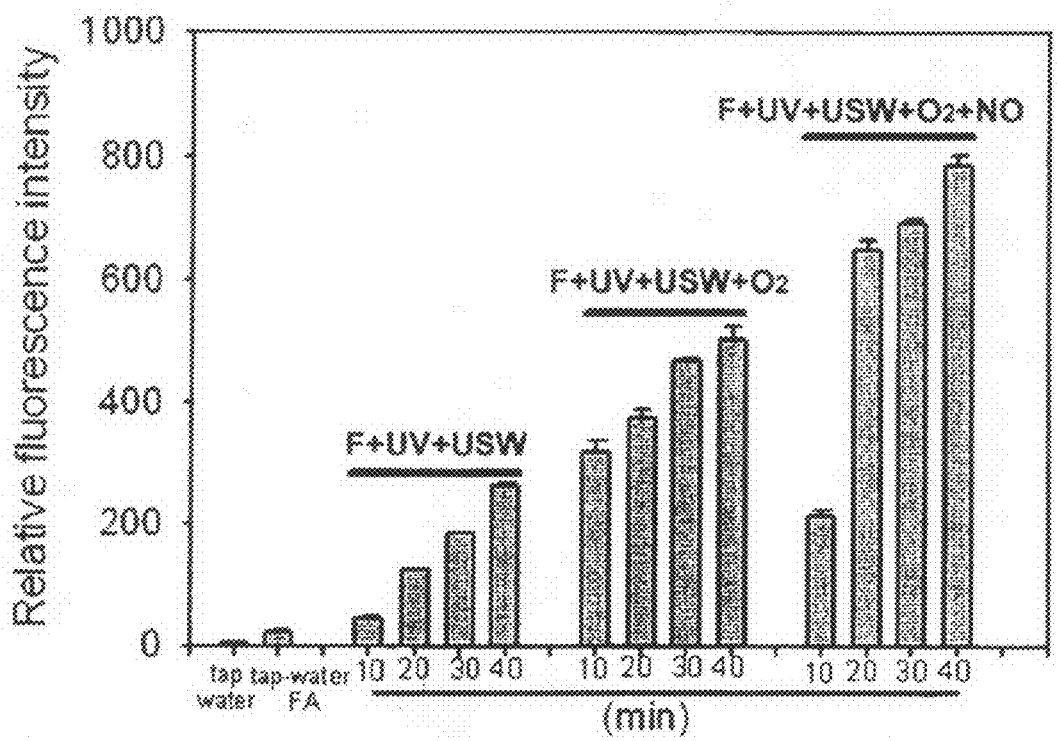

In a detection method of peroxy nitrate (.ONO$^-$.) by folic acid, the measurement of peroxy nitrate (.ONO$^-$.) is performed by making use of characteristic of folic acid that folic acid reacts with peroxy nitrate and is nitrated thus becoming a fluorescent material. (J-C. Huang, D-J. Li, J-C. Diao, J. Hou, J-L. Yuan and G-L. Zou (2007) A novel fluorescent method for determination of peroxynitrite using folic acid as a probe. *Talanta* 72 (4): 1283-1287). It is supposed that a reaction product contains 10-nitrofolic acid or the like. When folic acid is dissolved in circulating water at the concentration of 15 mM and the circulation experiment of tap water of circulating water quantity 10 L is performed in the same manner as the verification experiment 2, the increase of fluorescence which become the evidence of the generation of peroxy nitrate is confirmed (see FIG. 13). Since the increase of fluorescence is observed also before $O_2$ and NO are added, it is estimated that sources of supply of N and O are dissolved oxygen and dissolved nitrogen derived from oxygen and nitrogen in air which are absorbed from an air-liquid boundary surface of the reservoir in addition to oxygen and nitrogen dissolved in water.

In this case, it is thought that since the experiment is performed by a method which circulates folic acid aqueous solution, peroxy nitrate generated after the reaction is started and folic acid react with each other so that a stable fluorescent material is formed whereby the accumulation of fluorescence is observed with time. Peroxy nitrate is a material having high toxicity for organism and hence, it is expected that a technique for producing peroxy nitrate becomes a very important strategy for establishing a future sterilization technique. Since it has been already proved that superoxide anion radicals are generated in this experiment system, it is duly expected that superoxide anion radicals involve in the generation of peroxy nitrate. In this case, it is inferred that NO which is known to react with superoxide and to generate peroxy nitrate already exists. This implies that it is necessary to add a NO gas for the purpose of maximize the efficiency of producing peroxy nitrate in this superoxide anion radical generation system.

[Verification Experiment 6: Confirmation of Generation of Singlet Oxygen]

Next, in the substantially same circulation system as the system in which the above-mentioned confirmation of generation of superoxide anion radical is performed, the substantially same measurement as the above-mentioned measurement is performed using 10 L of ozone water having the initial concentration of 2.5 ppm as circulating water. To produce ozone water containing a large quantity of ozone as precursor substance for generating active oxygen species, Quick Ozone 10 made by Ai Electronic Industry Co., Ltd which produces ozone water using an ionization method is used. The concentration of dissolved ozone is measured using a calorimetric method by indigo carmine.

Figure 14:
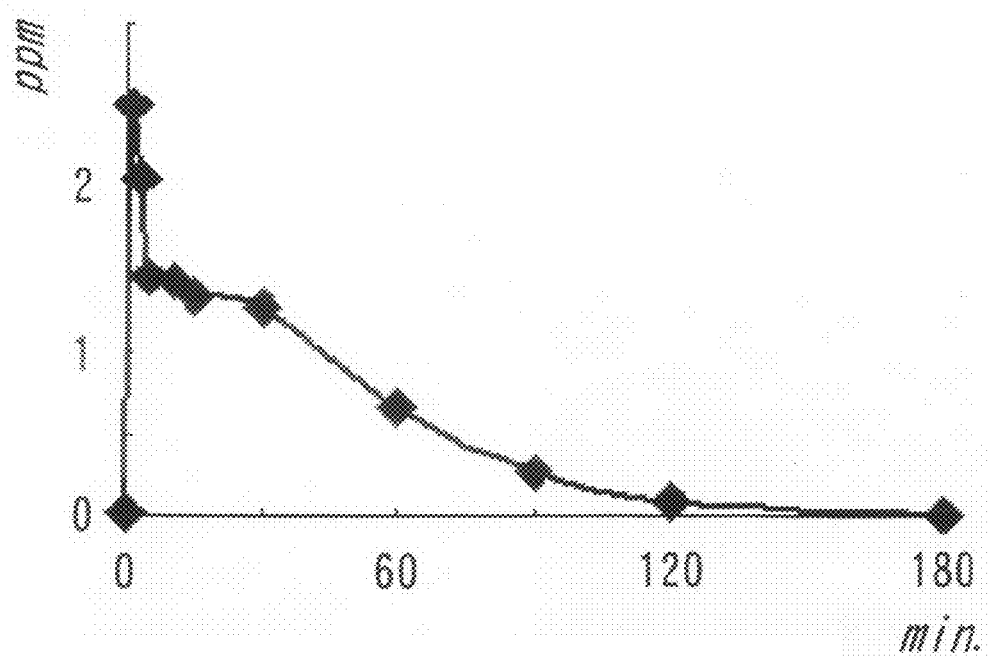

As shown in FIG. 14, water containing ozone having the initial concentration of 2.5 ppm as a precursor substance maintains the concentration of approximately 1.5 ppm for approximately 30 minutes when the ozone water does not react with catalytic body. As a prior art, it is known that ozone is decomposed by ultrasonic rays at a level of a bactericidal lamp. However, UV-A (365 nm) which induces a photocatalytic reaction does not prompt the decomposition of ozone so that ozone at high concentration is maintained.

Figure 15:
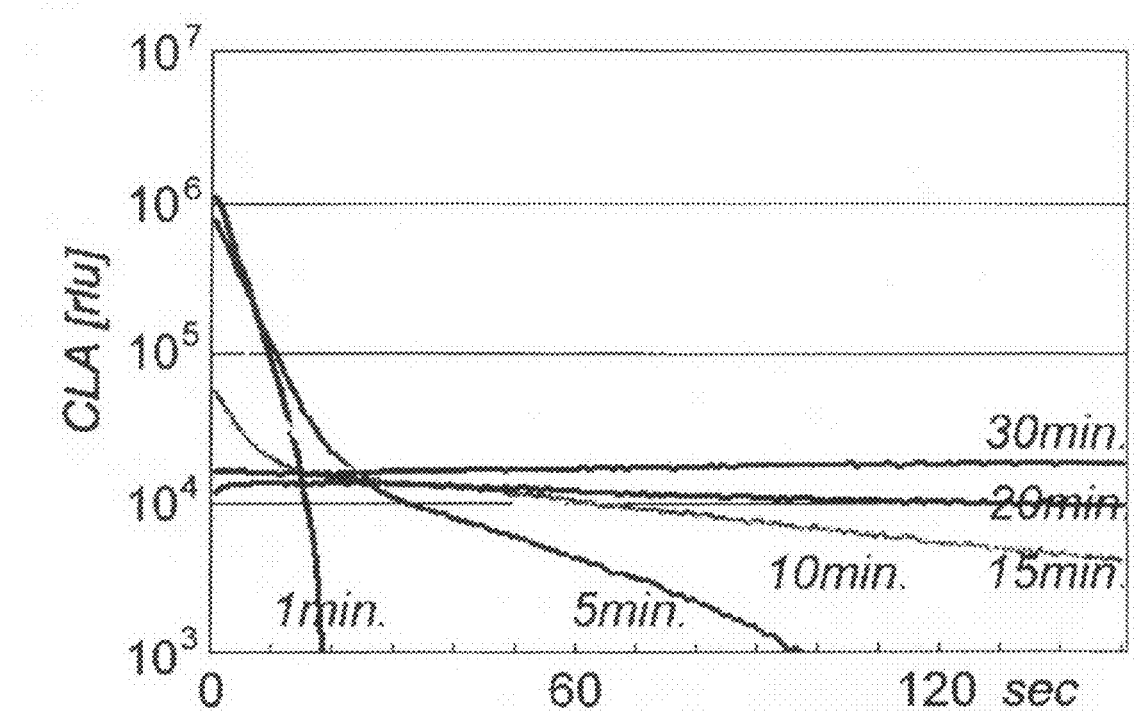

The result of experiment using ozone water having initial concentration of 2.5 ppm is shown in FIG. 15. Under the presence of catalytic body, the explosive chemiluminescence of CLA chemiluminescence which exceeds 100000 [rlu] at a maximum value is generated for five minutes after applying ultraviolet rays (UV-A) radiation and ultrasonic vibrations, and ozone is decomposed to a level of ozone concentration at 0.2 ppm, that is, to a level where ozone activity is hardly obtained when 3 minutes elapse after the reaction is started.

Figure 16:
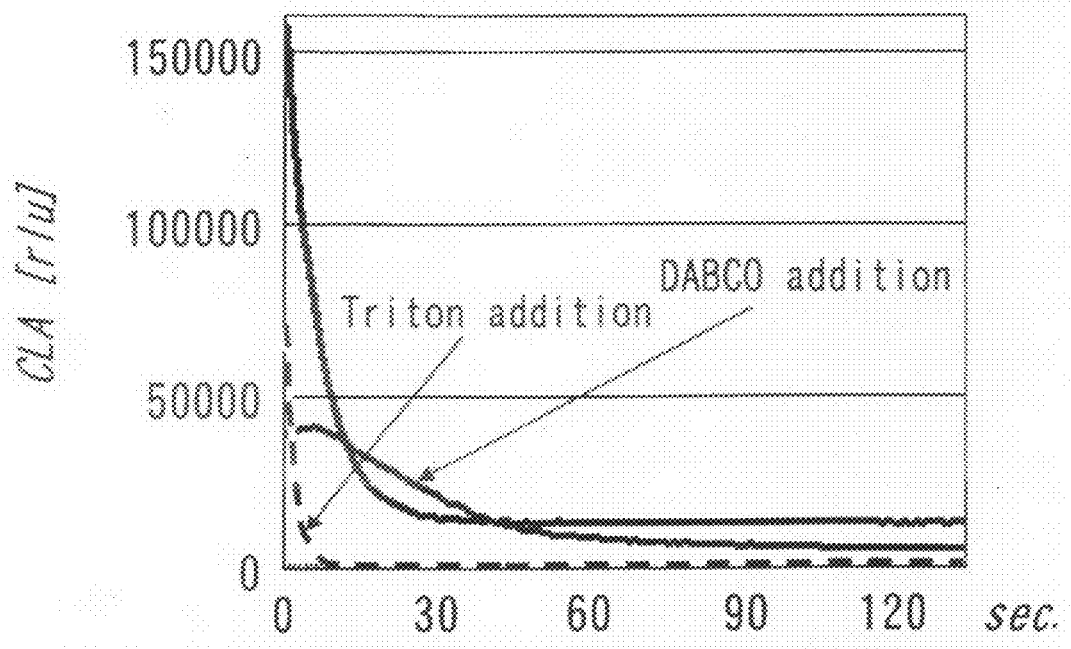

FIG. 16 shows a result of an inhibiting experiment performed by adding Tiron which is a superoxide removing agent and DABCO which is a singlet oxygen remover to a sample when three minutes elapse after the reaction starts.

From FIG. 16, it is found that most of CLA chemiluminescence having a spike shape is derived from the generation of singlet oxygen. Since there is no marker corresponding to the scale of singlet oxygen, it is found that active oxygen species at high concentration equivalent to 1.7 mM/L in terms of superoxide anion radicals can be generated. When the water to be treated is ozone water, it is possible to constantly generate water containing a large quantity of singlet oxygen and maintaining activity of oxygen species for a long period of time.

[Verification Experiment 7: Examination of Redox Activity by Active Oxygen Species Induced by Microwaves]

With respect to a single mode microwave generation device made by IDX Company, Ltd. microwaves of 2.45 GHz are radiated, a temperature of a solution in a test tube inserted in a reaction cylinder mounted on a waveguide is measured by a thermocouple inserted in the test tube and, it is possible to control the solution temperature to a constant value by changing a microwave output by computer control. A micro stirrer is put into the test tube and the solution is stirred gradually from a bottom surface of the test tube thus diffusing holes and free electrons which are stored in the test tube in the reaction tube or induced by the catalytic body mixed in the reaction solution in water whereby it is possible to generate active oxygen species.

Further, when the elevation of temperature in the reaction tube is suppressed by setting an outside temperature to 4° C., microwaves are radiated by an output as powerful as possible so that a temperature of a solution becomes 20° C., 10 to 20 W can be added to as a microwave output. Using this device, microwaves are radiated to various metal catalytic bodies, and CLA chemiluminescence of superoxide radicals and aequorin luminescence are measured, and redox activity is evaluated.

1 g of aluminum fibers having a size of 1'5 cm and having an alumina sintering film with a film thickness of 30 nm, and 1 g of titania fibers having a size of 1'5 cm and formed by baking a titania film on aluminum fibers having an alumina sintering film with a film thickness of 30 nm by dip coating are stored in test tubes which are inserted into reaction cylinders and microwaves are radiated to 5 ml of tap water. The radiation of microwaves is performed for 1 minute, 5 minutes and 10 minutes respectively, and water temperature is set to 20° C. Microwaves having intensity of approximately 10 to 15 W are applied to tap water.

The sample exhibits CLA chemiluminescence of 6000 rlu when 1 minute elapses after starting the radiation, and superoxide anion radicals which can be maintained and possess activity for a long time is detected in the same manner as the above-mentioned verification experiment for three minutes after the measurement is started. The sample exhibits CLA chemiluminescence of 8000 rlu at a maximum value and arrives at the concentration with which the redox activity can be induced when 5 minutes elapses after the measurement is started.

Using the substantially same tobacco cells as the verification experiment 3, aluminum, alumina, titanium, titania, magnesium oxide, aluminum hydroxide and magnesium hydroxide in a powder form respectively are adjusted to have the concentration of 25 mg/ml and are mixed into a cell floating liquid and microwaves are radiated to the cell floating liquid. Temperature of the floating liquid is adjusted to 40° C. and microwaves are radiated. The former inventors have clarified that a temperature load does not affect the tobacco culture cell until temperature of the floating liquid becomes 60° C. Aequorin luminescence is measured for 5 minutes after the radiation of microwaves is started, and microwaves having an output of 15 to 20 W are radiated.

With respect to the samples containing aluminum and titanium respectively, the aequorin luminescence is attenuated compared to a level before starting the radiation and hence, it is determined that these metals do not possess redox activity. To the contrary, in the samples containing alumina, titania, magnesium oxide, aluminum hydroxide and magnesium hydroxide, the aequorin luminescence is recognized and hence, active oxygen species having redox activity are generated.

As a result of the above-mentioned experiment, it is found that active oxygen species are generated on the catalytic body surface even with the radiation of microwaves. When microwaves are used in the water producing apparatus according to the present invention, active oxygen species are generated by arranging an antenna type microwave radiation source in the water producing apparatus A. In this case, a large quantity of water flows on the catalytic body and cools the catalytic body and hence, it is possible to increase a microwave output leading to the further generation of redox activity.

To further enhance the reaction efficiency, although not shown in the drawing, single mode microwaves may be radiated to the catalytic body from a side surface of the catalytic body, ultrasonic vibrations may be applied to the catalytic body from a bottom surface of the catalytic body, and ultraviolet rays UV-A may be radiated to the catalytic body using a superluminescent LED from an upper surface of the catalytic body thus generating highly concentrated active oxygen species whereby it is possible to induce strong redox activity.

[Verification Experiment 8: Comparison of Generation of Active Oxygen Species by Changing Parameters]

Next, generation quantities of active oxygen species are compared between the active oxygen water producing apparatus A and the active oxygen water producing apparatus B according to the present invention.

Further, in the active oxygen water producing apparatus A, tests are performed with respect to a catalytic body obtained by coating alumina film on aluminum fibers and a catalytic body obtained by further coating titania on the alumina film. The following comparative circulation experiment is performed by exchanging the catalytic body 25 which is mounted on the generation device A (reaction generation vessel 73) as shown in the verification experiment 2 and with respect to the catalytic bodies divided into three groups of A) catalytic body with no fibers B) catalytic bodies containing 10 g of aluminum fibers with alumina sintered film having film thickness of 30 nm C) catalytic bodies containing 10 g of titania fibers with alumina sintered film having film thickness of 30 nm and with titania film formed by dip coating and baking.

Further, this verification experiment uses tap water 10 L as the circulating water in the same manner as the verification experiment 2 and tap water is preliminarily circulated. The verification experiment is carried out as follows. Water temperature is set to 20° C. A group (D02) of water whose dissolved oxygen concentration (D0) is adjusted to 2 mg/L (dissolved oxygen concentration being preliminarily adjusted by boiling), a group (D08) of waters whose dissolved oxygen concentration (D0) is adjusted to 8 mg/L and a group (D30) of water whose dissolved oxygen concentration (D0) is adjusted to 30 mg/L are prepared. Each group of waters is constituted of waters which differ in the catalytic body 25 arranged in the above-mentioned water producing apparatus A. Further, four groups of waters are prepared due to the combination of the presence or non-presence of ultrasonic wave vibrations (USW) and the presence or non-presence of ultraviolet rays radiation (UV-A; WL=364 nm).

The water temperature and the dissolved oxygen concentrations are maintained at constant values during the experiment thereafter, and the generation quantity of active oxygen species is measured by detecting superoxide anion radicals in such a manner that CLA dependent chemiluminescence is detected by a luminometer which uses Cypridina luciferin analog.

Figure 17:
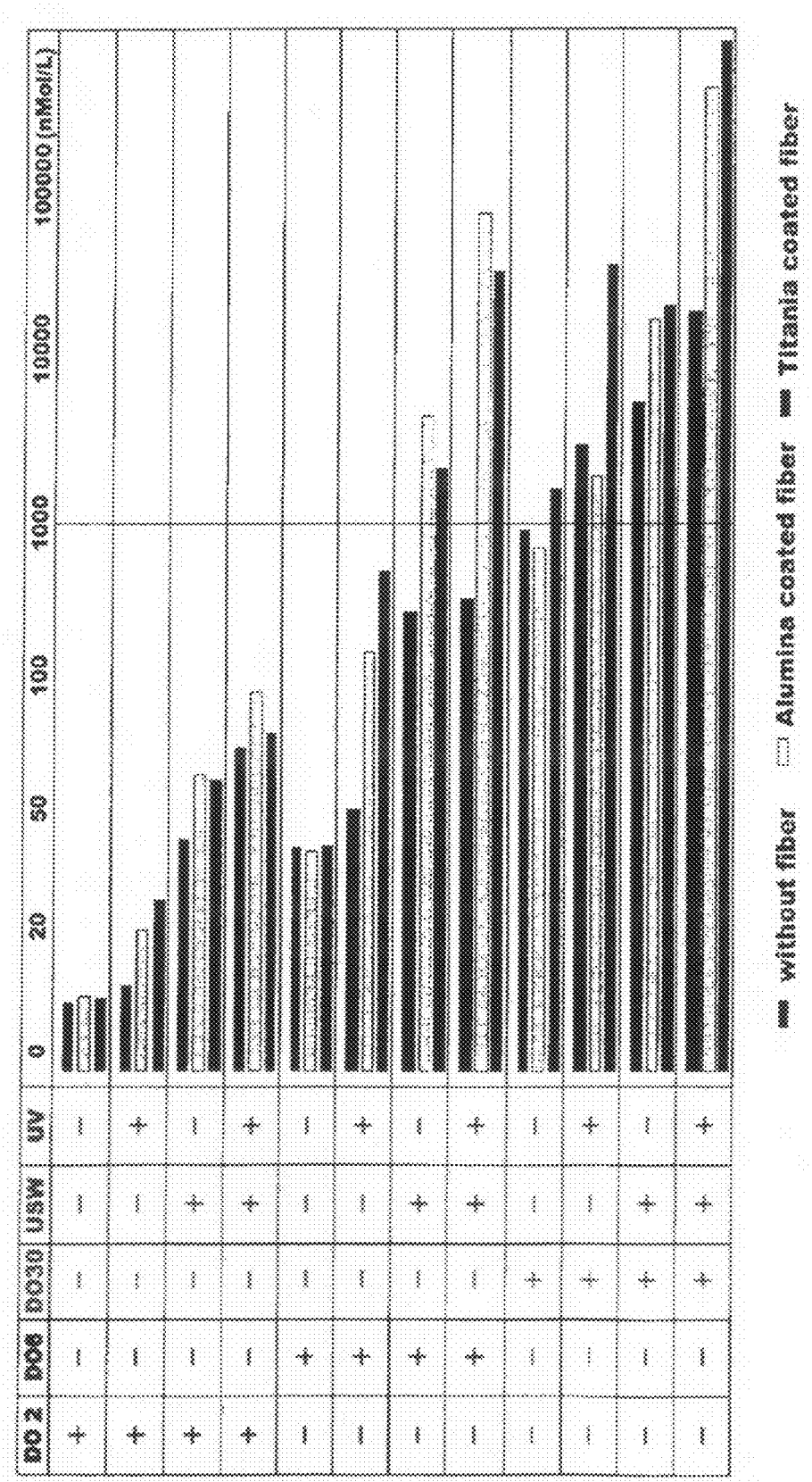

FIG. 17 shows a result of the measurement, and indicates the concentration of superoxide anion radicals obtained based on a maximum value of CLA dependent chemiluminescence obtained at a point of time that 30 minutes elapse from starting of the experiment.

As shown in FIG. 17, a generation quantity of active oxygen becomes minimum in a state where dissolved oxygen concentration (D0) is D2, ultrasonic wave vibrations (UV) are in an OFF state and ultraviolet rays radiation (UV) is an OFF state, while a generation quantity of active oxygen becomes maximum in a state where dissolved oxygen concentration (D0) is D030, ultrasonic wave radiation (USW) are in an ON state and ultraviolet rays radiation (UV) is in an ON state.

Further, to study this result in more detail, as can be understood in view of the active oxygen water producing apparatus B (without fibers), an active oxygen generation quantity is increased in order of a state where ultrasonic wave vibrations (USW) is in an OFF state and ultraviolet rays radiation (UV) is in an OFF state <a state where ultrasonic wave vibrations (USW) is in an OFF state and ultraviolet rays radiation (UV) is in an ON state <a state where ultrasonic wave vibrations (USW) is in an ON state and ultraviolet rays radiation (UV) is in an OFF state. Accordingly, this result proves that even when the catalytic body is not used, with the use of the active oxygen water producing apparatus B according to this embodiment, it is possible to effectively generate active oxygen species in water by giving ultrasonic waves to water (running water).

Further, there is found the tendency that the case where the dissolved oxygen concentration is elevated to D030, compared to the case where the dissolved oxygen concentration is D02 or D06, increases the active oxygen quantity irrelevant to the presence or non-presence of the catalytic body. It is also found that the larger a quantity of oxygen supplied to water, the more effectively the active oxygen is generated.

Further, to focus on an experiment system where the D0 value is set to 30 m/L in four low columns in FIG. 17, it is found that when only the ultraviolet rays are radiated to the catalytic body, the catalytic body coated with titania coating generates a larger quantity of active oxygen species compared to a catalytic body which exposes an alumina film on an outer surface thereof. On the other hand, when only ultrasonic waves are applied to the catalytic body, no substantial difference is found between the catalytic body coated with the alumina film, and the catalytic body coated with titania coating. Further, it is found that generation quantities of active oxygen species by these catalytic bodies exceed 1 mmol/L and the active oxygen water exhibits redox activity by verification of the above-mentioned aequorin luminescence.

Further, when the ultrasonic waves and ultraviolet rays are used in combination, the catalytic body to which titania coating is applied exhibits the extremely high generation of active oxygen species, and the catalytic body which is provided with an alumina film on an outer surface thereof also exhibits the generation of active oxygen species comparable to the catalytic body to which titania coating is applied.

Further, the maximum concentration of water having the increased dissolved oxygen concentration due to the combined use of ultrasonic waves and ultraviolet rays exceeds 200 mmol/L. Accordingly, even paramecium bursaria which is active oxygen resistant species which do not receive cellular cytotoxity at the concentration of 200 ppm or more receives oxygen stress due to the exposure for one minute and is led to cell death.

Further, it is found that due to the use of ultrasonic waves and ultraviolet rays in a single form or in combination, a large quantity of active oxygen species can be generated in both of the active oxygen water producing apparatus A and active oxygen water producing apparatus B according to this embodiment.

As has been explained heretofore, according to the method for producing water containing active oxygen species and the apparatus for producing water containing active oxygen species, irrespective of the clarity (ultraviolet rays permeability) of water, it is possible to efficiently generate a large quantity of active oxygen species in water (running water).

Finally, the above-mentioned respective embodiments explained heretofore are provided merely as examples, and the present invention is not limited to the above-mentioned embodiments. Accordingly, it is needless to say that various modifications are conceivable depending on design or the like without departing from the technical concept of the present invention even when the modifications differ from the above-mentioned embodiments.

The invention claimed is:

1. An apparatus for producing water having redox activity, comprising an electromagnetic wave source and a fibrous catalytic body arranged with a fixed gap defined therebetween thus allowing water to flow into or flow out from the fibrous catalytic body,
   wherein the apparatus comprises a source of electromagnetic waves and/or a source of ultrasonic vibrations and the apparatus is configured to bring water or running water into contact with the fibrous catalytic body while radiating electromagnetic waves to the fibrous catalytic body and/or applying ultrasonic vibrations to the fibrous catalytic body thus causing the water to contain active oxygen species at an initial concentration of 1 μmol per liter or more,
   the apparatus further comprising a closed vessel having an independent water inlet and an independent water outlet for water or running water, the closed vessel actin as a reaction generation vessel for producing water having redox activity,
   the source of electromagnetic waves comprises a source of short wavelength electromagnetic waves arranged in water in the closed vessel,
   the fibrous catalytic body surrounds the periphery of the electromagnetic wave source with a fixed gap therebetween,
   whereby a water flow is formed of a first water flow which ascends or descends by passing through the gap defined between a microwave source and the fibrous catalytic body, a second water flow which ascends or descends by spirally passing over the outer periphery of the fibrous catalytic body, and a third water flow which flows into or flows out from tissues of the fibrous catalytic body, the catalytic body being formed by coating an alumina film having a film thickness of 30 nm or more on a surface of aluminum fibers.

2. The apparatus for producing water having redox activity according to claim 1, wherein the catalytic body is formed by irregularly collecting titania fibers formed by coating the alumina film with titania.

3. The apparatus for producing water having redox activity according to claim 1, wherein the apparatus comprises a source of ultrasonic vibrations and the source of ultrasonic vibrations generates ultrasonic waves of 101 kHz or more and less than 500 kHz.

4. The apparatus for producing water having redox activity according to claim 1, wherein the apparatus comprises a source of ultrasonic vibrations, the source of ultrasonic vibrations generating ultrasonic waves of 500 kHz or more.

5. The apparatus for producing water having redox activity according to claim 1, further comprising a source of at least one member selected from the group consisting of oxygen, ozone, chlorine, nitrogen monoxide and ammonia for being mixed with the water or running water while adjusting a dissolved concentration prior to contact of the water or running water with the fibrous catalytic body.

6. The apparatus for producing water having redox activity according to claim 1, wherein the apparatus comprises a source of ultrasonic vibrations and a source of electromagnetic waves and is configured to vibrate free ends of the fibrous catalytic body by imparting ultrasonic vibrations to the fibrous catalytic body while radiating the electromagnetic waves from the electromagnetic wave source to the fibrous catalytic body, the ultrasonic vibrations thus increasing a flow speed of water which flows while being in contact with surfaces of the fibrous catalytic body, whereby the active oxygen species generated by the radiation of the electromagnetic waves to the fibrous catalytic body is diffused in the water which flows on the surfaces of the fibrous catalytic body thus causing active oxygen species to be formed in the water, and wherein the water is discharged and taken out from the reaction generation vessel for producing water having redox activity.

* * * * *